US010481568B2

(12) United States Patent
Tian et al.

(10) Patent No.: US 10,481,568 B2
(45) Date of Patent: Nov. 19, 2019

(54) ONE-CLICK MOTOR CONFIGURATION

(71) Applicant: LINESTREAM TECHNOLOGIES, Cleveland, OH (US)

(72) Inventors: Gang Tian, Westlake, OH (US); Adam Reynolds, Shaker Heights, OH (US); Chris Knaack, Bay Village, OH (US)

(73) Assignee: DANFOSS POWER ELECTRONICS A/S, Grasten (DK)

( * ) Notice: Subject to any disclaimer, the term of this patent is extended or adjusted under 35 U.S.C. 154(b) by 234 days.

(21) Appl. No.: 15/626,312

(22) Filed: Jun. 19, 2017

(65) Prior Publication Data
US 2018/0364656 A1 Dec. 20, 2018

(51) Int. Cl.
*G05B 13/04* (2006.01)
*G05B 13/02* (2006.01)
*G05B 19/042* (2006.01)

(52) U.S. Cl.
CPC ....... *G05B 13/041* (2013.01); *G05B 13/0265* (2013.01); *G05B 19/0426* (2013.01); *G05B 2219/25056* (2013.01)

(58) Field of Classification Search
CPC .................................................... G05B 13/04
USPC .................................................. 318/34, 558
See application file for complete search history.

(56) References Cited

U.S. PATENT DOCUMENTS 6,281,650 B1 * 8/2001 Yutkowitz .............. G05B 11/42
318/561
7,718,219 B2 5/2010 Mahoney et al.
7,719,219 B2 * 5/2010 Baumann ............. G05B 19/409
318/461
7,890,212 B2 2/2011 Cornett et al.
8,041,436 B2 10/2011 Gao
8,060,340 B2 11/2011 Gao et al.
8,710,777 B2 4/2014 Tian
9,041,337 B2 5/2015 Tian
10,222,776 B2 * 3/2019 Reynolds ........... G05B 19/0426
(Continued)

OTHER PUBLICATIONS

Danfoss VLT 2900 guide.
(Continued)

*Primary Examiner* — David Luo
(74) *Attorney, Agent, or Firm* — Amin, Turocy & Watson LLP

(57) ABSTRACT

A system is disclosed for configuring a motor controller using a one-click configuration scheme, simplifying the process of motor configuration in drives and similar devices. The system includes a specify component, a display component, and a single-action identification and configuration component. The specify component specifies a motor in communication with the motor controller. The display component displays information on the status of the motor controller. The single-action identification and configuration component, in response to performance of only a single action (i.e., a single-click or equivalent starting signal), performs an identification and configuration sequence for the motor comprising at least three identification steps to establish a single parameter for driving the motor. The at least three identification steps can include measurements of system parameters, noise, and resonance. The recommend bandwidth for motor operation can be selected from within a range of permissible bandwidths.

21 Claims, 16 Drawing Sheets

(56) References Cited

U.S. PATENT DOCUMENTS

2014/0379102 A1   12/2014  Tian et al.
2016/0033944 A1    2/2016  El-Shaer et al.
2016/0094628 A1    3/2016  Husain et al.
2016/0209816 A1    7/2016  Neundorfer
2016/0276966 A1    9/2016  Tian
2017/0074753 A1    3/2017  Tian

OTHER PUBLICATIONS

Danfoss VLT Micro Drive FC 51 guide, www.danfoss.com/drives.
LSIS Co., Ltd., LSIS XGT guide, http://www.lsis.com, 2015.
Panasonic Corporation, Panasonic Minas A5 guide, 2009.
Siemens AG, Siemens Sinamics guide, 2006.

* cited by examiner

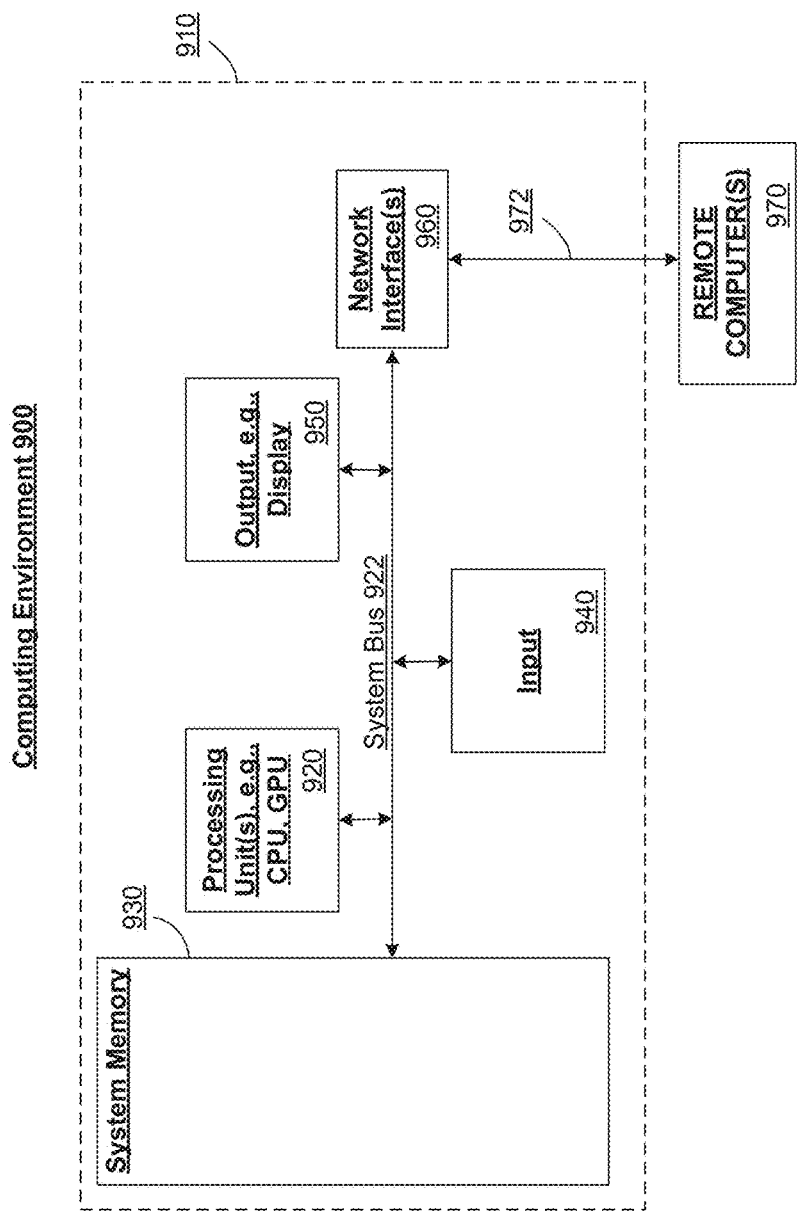

ONE-CLICK MOTOR CONFIGURATION

TECHNICAL FIELD

The subject matter herein relates to industrial controllers and drives for motors and the programming thereof, and associated methods therewith.

BACKGROUND

Industrial controllers are often used to control the operation of motors in industrial applications or appliances. In some implementations, the controller may be embodied in a silicon chip, where the silicon chip may be a microcontroller programmed with a set of instructions related to the microcontroller architecture. Industrial drives may also be used to control motors. Such industrial drives may be used to control individual motors, or to control groups of motors. An industrial drive may be programmed with a set of instructions for controlling operations of the motor or group of motors. These instructions may be written in low-level code that is understood by a microprocessor, or microcontroller, that is used in the system.

A given motor may have many parameters that can be controlled and tuned, rendering the process of configuring a motor-driven control application a difficult and complicated task.

The above-described is merely intended to provide an overview of some of the challenges facing conventional motion control systems. Other challenges with conventional systems and contrasting benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

One or more embodiments of the present disclosure relate to systems and methods for configuring a motor controller using a one-click configuration scheme. This one-click technique can simplify the process of motor configuration in drives and similar devices. In one or more embodiments, the system can include a specify component, a display component, and a single-action identification and configuration component. The specify component specifies a motor in communication with the motor controller. The display component displays information relating to the status of the motor controller. The single-action identification and configuration component, in response to performance of only a single action (i.e., a single-click or equivalent starting signal), performs an identification and configuration sequence for the motor.

The single-action identification and configuration sequence executes at least three identification steps to establish a single parameter for driving the motor. The at least three identification steps in the identification and configuration sequence can comprise measurements of system parameters, noise, and resonance. The system parameters may comprise electrical parameters as well as mechanical parameters. Noise measurements may encompass several types of noise, including but not limited to noise introduced through quantization, calculated precision, and electrical coupling. The sequence may identify more than one resonant frequency. From these three identification steps, the sequence can determine a single drive parameter, such as a recommend bandwidth for motor operation. In some embodiments, the single drive parameter can be selected from a range of permissible bandwidths. In other embodiments, the system can present a range of permissible bandwidths and enable a user to select a final bandwidth parameter for motor operation. Additional features can provide further benefits. For example, some embodiments of the system may optionally include a notch filter configuration component to suppress resonance. The guided and intuitive workflow implemented by the single-action identification and configuration component allows a user having limited familiarity with a particular motor and its control hardware to run the motor out-of-the-box.

The following description and the annexed drawings set forth herein detail certain illustrative aspects of the one or more embodiments. These aspects are indicative, however, of but a few of the various ways in which the principles of various embodiments can be employed, and the described embodiments are intended to include all such aspects and their equivalents.

BRIEF DESCRIPTION OF THE DRAWINGS

FIG. 9 is a block diagram representing an exemplary computing system or operating environment for implementing one or more embodiments described herein.

DETAILED DESCRIPTION

Figure 1:
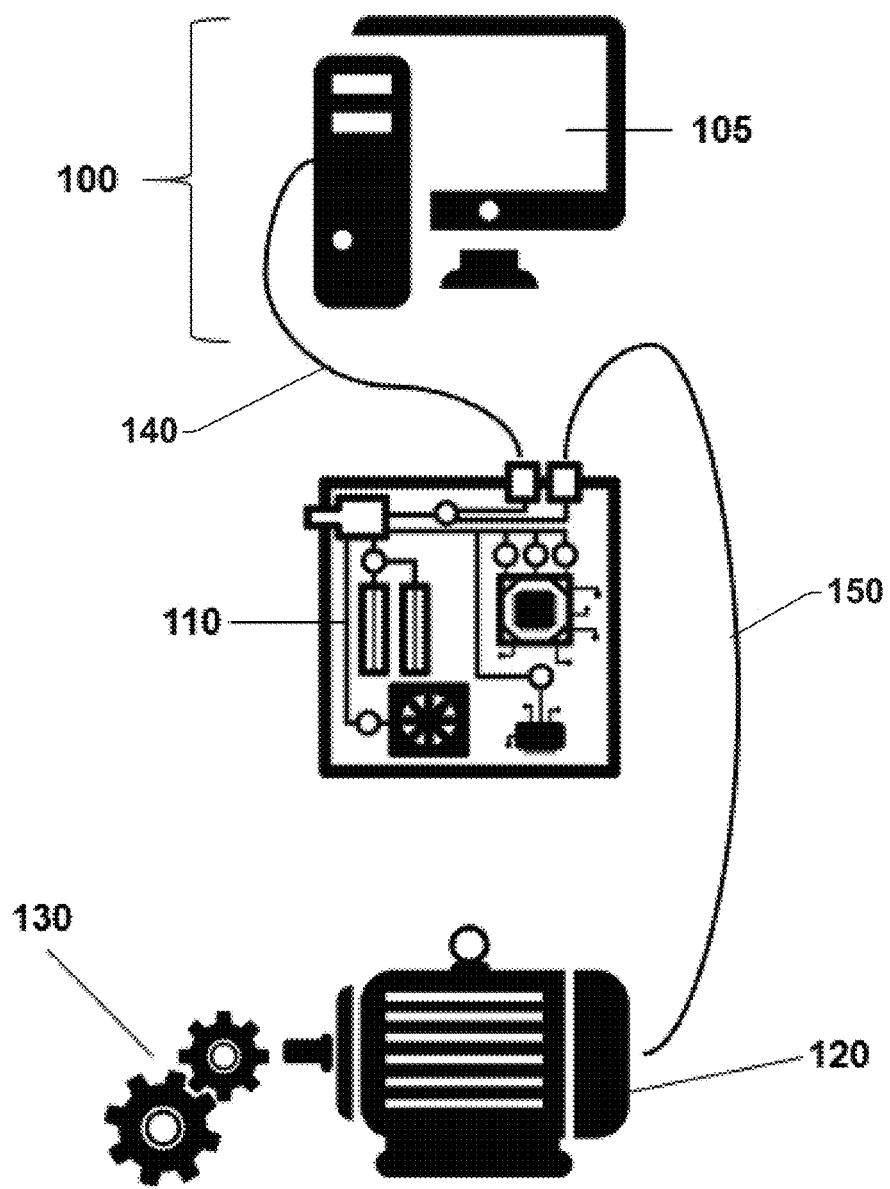
FIG. 1 is a block diagram of a motor control system and computer apparatus for programming the motor control system.

Various embodiments are now described with reference to the drawings, wherein like reference numerals refer to like elements throughout. In the following description, for the purposes of explanation, numerous specific details are set forth in order to provide an understanding of this disclosure. It is to be understood, however, that such embodiments may be practiced without these specific details, or with other methods, components, materials, etc. In other instances, structures and devices are shown in block diagram form to facilitate describing one or more embodiments.

A motor may have a number of parameters that can be controlled and tuned. In some applications, one or more parameters of a motor-driven system control may be controlled using a feedback control algorithm. A number of different types of feedback control algorithms are available, including proportional-integral-derivative (PID) control algorithms. A PID controller uses three parameters as part of its tuning algorithm—the proportional (P), the integral (I), and the derivative (D) values. The P value is related to the current error in the system. The I value (as an integral or accumulation of past errors) is related to past error. The D value (as the derivative or rate of change of error) is related to future error.

Control engineers can spend a significant amount of time and effort configuring or "tuning" these three parameters—both algorithmically and manually—for optimal performance across operating conditions in real-world instances of motor-driven system control. In many applications, the output signal generated by the feedback algorithm is used to control the speed of the motor, and the feedback signal provided to the algorithm represents a measured actual speed of the motor. Alternatively, some applications may use pressure as a defining control loop, such that the system outputs a speed control signal but does not use speed for feedback. The commissioning of such systems can be achieved equivalently.

Alternative methods for feedback control have been developed. One such method is disturbance rejection control (DRC) and its subset, active disturbance rejection control (ADRC). Disturbance rejection control and active disturbance rejection control differ from PID control by introducing an extended state observer (ESO). The ESO is incorporated in the control feedback loop to decouple the plant, or target, of motor-driven system control, from the disturbances acting upon the plant. In some instances, (A)DRC may have ten or more tunable parameters, making it more complex to implement than PID control. A preferred form of (A)DRC is parameterized ADRC, which frequently simplifies tuning relative to a comparable PID controller. In some instances, tuning a parameterized ADRC system can be reduced to tuning a single parameter—typically bandwidth—while achieving process control results similar to, if not exceeding, a comparable PID controller across operating conditions.

Even with feedback control methods, such as (A)DRC, that require fewer tuning parameters, setting up a motor for use within a particular motion control application is still a complex process. To simplify the process of configuring a motor control system for a given motor-driven application, wizards can be used to configure motor control programs. A wizard is a sequential on-screen dialog that guides a user through a configuration process, including but not limited to initialization processes. Because wizards typically execute on a computing device that includes a display and an input device, such wizards can facilitate fast and user-friendly programming of an industrial device, such as a motor, that may not have a user interface. A drive system may include a user interface, so it is possible to execute a wizard through the user interface of a drive system, or an external computing device in communication with the drive system.

While some wizard-based software configuration systems have been developed, such systems require multiple inputs form the user and involve many steps. For example, some wizards developed for configuring motor-control systems may determine a noise parameter based on received mechanical characteristic data associated with a motor identified by a user, and adjust at least one controllable filter parameter as a function of the noise parameter. However, such wizards require multiple inputs from the user, and involve separate steps are required inertia and resonance. Consequently, such wizards are not able to perform a complete configuration sequence for a motor in a single-action from a user.

Other example wizards are configured for programming a programmable logic controller (PLC), which can include a motor drive. Such wizards produce a set of parameter configurations as well as a set of instructions for use in a customized program. However, such systems also require multiple inputs from the user, and do not automate the computation of inertia, noise, and resonance parameters. As such, such wizards cannot perform a complete configuration sequence for a motor in a single-action from a user.

Various manufacturers of motor drive systems also offer "wizards" or "auto-configuration" or "auto-tuning" features as part of their product offerings. For example, some configuration systems include an automatic motor tuning function, but are limited to measuring stator resistance with the motor running. Other example commissioning tools provide automatic commissioning capabilities as part of their environment, but may simply identify and load the software drivers for particular motors. Such commissioning tools also require execution of more than one step, and may leave the user with a list of motors that require further configuration in an offline mode. Moreover, some configuration tools that support real-time auto-tuning are limited to inertia estimation. Consequently, resonance estimation requires execution of a different step, and noise can render such systems inoperable in certain situations.

Co-pending patent application Ser. No. 15/262,219 to applicant also describes a wizard for configuring a motor. This co-pending patent application is incorporated in this disclosure by reference. The wizard described therein improves over other art, providing a simple user interface for adapting a motor control program for use in a customized setting.

In general, current wizards for motor control systems suffer from certain challenges. Configuring motor control programs, even through the use of current wizards, involve a great deal of complexity. For example, such wizards include multiple interface screens with multiple input parameters on each screen, which may confuse an application developer who is more familiar with his or her application requirements than with the subtleties of a particular motor.

To address these and other issues, one or more embodiments described herein provide a motor configuration system that balances the simplicity of a wizard format with the recognition that configuring a motor may require the setting of various parameters to work effectively in a particular application environment. Embodiments of the wizard-based system described herein reduce the configuration task to a one-click identification and configuration scheme, simplifying the process of motor configuration in drives and similar devices. When single-action identification and configuration is enabled, the user need only perform a single action (e.g., one click a mouse button, one press or swipe of a touch-sensitive display, one press of a button, a single hand gesture with an appropriate reader, or some other single instantiation step now known or hereafter developed) to configure the motor. When the user performs this single action, the wizard then completes the configuration by performing a multi-step identification and configuration sequence to run the motor according to a single optimized parameter. Thus, once the motor is physically connected and identified, the user need only take a single action to complete its configuration.

Optionally, in some embodiments, the configuration system can also support fine tuning of a motor control program in an effective way. In some scenarios, there may be no ability to fine tune a motor control program using a wizard. Whereas some existing wizards suffer from requiring fine tuning of many parameters, or requiring low-level knowledge of the motor or the microprocessor or microcontroller that operates the motor, embodiments of the wizard environment described herein can employ a simple click-to-edit procedure to fine tune selected elements of the motor control program for a particular application environment.

One or more embodiments of the configuration system described herein can include a specify component, a display component, and a single-action identification and configuration component. The specify component specifies a motor in communication with the motor controller. The display component displays information on the status of the motor controller. The single-action identification and configuration component, in response to performance of only a single action (i.e., a single-click or equivalent starting signal), performs an identification and configuration sequence for the motor. The identification and configuration sequence comprises at least three identification steps to establish a single parameter for driving the motor. For example, the at least three identification steps in the motor identification and configuration sequence may comprise measurements of system parameters, noise, and resonance. In some embodiments, the recommend bandwidth for motor operation may be selected from within a range of permissible bandwidths. Optionally, some embodiments of the system may also include a notch filter configuration component and other features.

FIG. 1 is a block diagram of an example motor control system and computer apparatus for programming the motor control system. Computer 100 may be a general-purpose computer or application-specific computer used to implement the invention. A general-purpose computer may be, for example, a laptop personal computer, a work station, or a server computer. The configuration system described herein can also be implemented on a tablet computing device, a smart phone, or other mobile personal computing device. In one or more embodiments, an application-specific computer may be a drive system for use in a motor control system.

Computer 100 includes an input device that allows a user to communicate with the system. The input device may comprise a mouse, a button, or another suitable input device, including devices now known or later developed. For example, the input device may comprise voice activation or motion activation that allows the user to operate the equipment in a hands-free manner. Computer 100 also includes a display 105 that renders output data to the user. Display 105 can be, for example, a stand-alone or integrated visual display. The display can render output data using any suitable data rendering technology, including but not limited to interactive graphical displays, simple light emitting diode (LED) indicators or segment displays, etc. In some embodiments, the display 105 may be the same as the input device, as in scenarios in which the display is a touch-screen display. In some embodiments, display 105 may be auditory or haptic, which allows information to be conveyed to a user in non-visual manners.

Controller 110 is used to drive a motor control system. Controller 110 may be a standalone device, or may be integrated with other elements of the system. In one or more embodiments, controller 110 can be a standalone and packaged device, which is typically referred to as a drive. In other embodiments, controller 110 can be integrated with motion device 120, where motion device 120 includes embedded drive electronics. FIG. 1 illustrates a first communicative connection 140 between controller 110 and computer 100, and second communicative connection 150 between controller 110 and motion device 120. These communicative connections may comprise physical connections such as wires, cables, optical or electronic interlinks, and/or shared printed circuit board elements. In one or more embodiments, connections between one or more of the devices may also be wireless, using any suitable wireless protocol. Example protocols include, but are not limited to, general purpose wireless protocols such as Bluetooth and WiFi, as well as industrial protocols such as (wireless or wired) HART, Zigbee, and the like. Proprietary buses and wireless links can also be used to provide greater security or performance.

In one or more embodiments, controller 110 may be a programmable logic controller adapted to generate a pulse train, the pulse train adapted to control motion of a motion device 120. Motion device 120 may be at least one of a stepper drive, servo drive, stepper motor, servomotor, linear motor, motor, ball screw, servo valve, hydraulic actuator, or pneumatic valve.

Motion device 120 is a device configured to perform an actuation in accordance with an electronic signal. Motion device 120 can have at least two states. In a first state, motion device 120 is unloaded, such that the only load seen by the motion device is its internal inertia. In a second state, motion device 120 is connected to a mechanical load 130, which impacts the performance of motion device 120. Accordingly, controller 110 incorporates one or more feedback control algorithms designed to achieve relatively uniform and predictable performance of motion device 120 between the loaded and unloaded states. Example feedback control algorithms can include PID and (A)DRC algorithms. Motion device 120 is assumed to be a motor in the examples described herein. In the examples described herein, motion device 120 is assumed to be a surface-mounted permanent-magnet synchronous motor (PMSM). However, embodiments of the configuration system described herein can be applied to other types of motors or motion devices. Examples include but are not limited to cranes, conveyors, heating ventilation and air conditioning (HVAC) systems, marine systems, wastewater systems, and appliance systems (e.g., spin dryers, centrifuges, etc.). Example motion devices may include but are not limited to belt drives (conveyor), fans and blowers (HVAC), propellers (marine and aerospace), pump and valve control (water and wastewater), drive motors (electric vehicles), linear motors (medical devices), stepper motors (disk drives), and various types of motion devices used in aerospace, robotics, and other application domains.

Load 130, as described through additional examples herein, is associated with an application area, or functional domain. For example, load 130 may be the propulsion system in an electric vehicle (or more broadly, a vehicle), wherein controller 110 directs motion device 120 (a motor in this case) to start, stop, and regulate the motion of the vehicle. During programming of controller 110, load 130 may be simulated. During normal operation during which controller 110 independently directs operation of load 130, computer 100 may be removed from the system.

Figure 2:
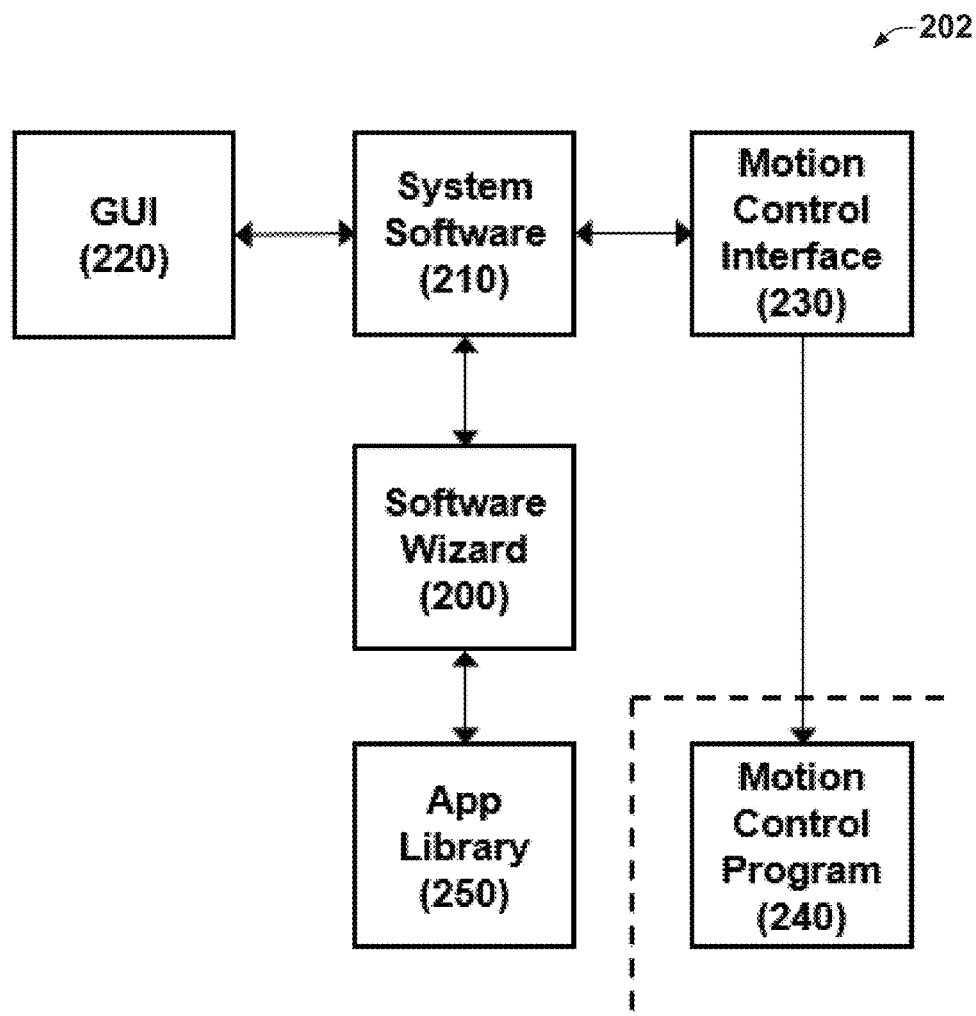
FIG. 2 is a block diagram of software blocks that comprise a system for configuring a motor.

FIG. 2 is a block diagram of software blocks that comprise a system 202 for configuring a motor. In some embodiments, the blocks depicted in FIG. 2 can comprise software instructions stored on a memory (e.g., a memory of computer 100) and executed by one or more processors (e.g., a processor of computer 100). Components of the system 202 may also interact with other hardware and/or software components not depicted in FIG. 2. For example, one or more of the software blocks depicted in FIG. 2 may interact with one or more external user interface devices, such as a keyboard, a mouse, display or touchscreen 105, or other such interface devices.

Software wizard 200 forms the core of the system 202, and is used to integrate and direct the other modules. Any number of computer programming languages may be used to develop the source code comprising software wizard 200. Python and C# are examples of computer programming languages that can be used to implement one or more functions of the wizard described herein. System software 210 is an environment that is supported on computer 100 (e.g., Linux, Microsoft Windows, Android, iOS, VxWorks or other such computer operating environments). Through protocols known in system software 210, software wizard 200 communicates with other components. A graphical user interface, or GUI 220, is used to communicate with an external user, accepting his or her input as well as displaying visual and/or audio information to the user. A motion control interface 230 resides between software wizard 200 and system software 210 on the one hand and motion device 120 (not shown) on the other. Motion control interface 230 is configured to transfer a motor control program 240 to controller 110 or motion device 120, on which the motor control program 240 carries out its execution. During control of load 130, only motor control program 240 is required, as illustrated by the dotted lines. In addition, application library 250 may be in communication with software wizard 200, either directly or through system software 210, to provide a number of application prototypes, or profiles, that are useful for a particular motor control device and application context.

Figure 3A:
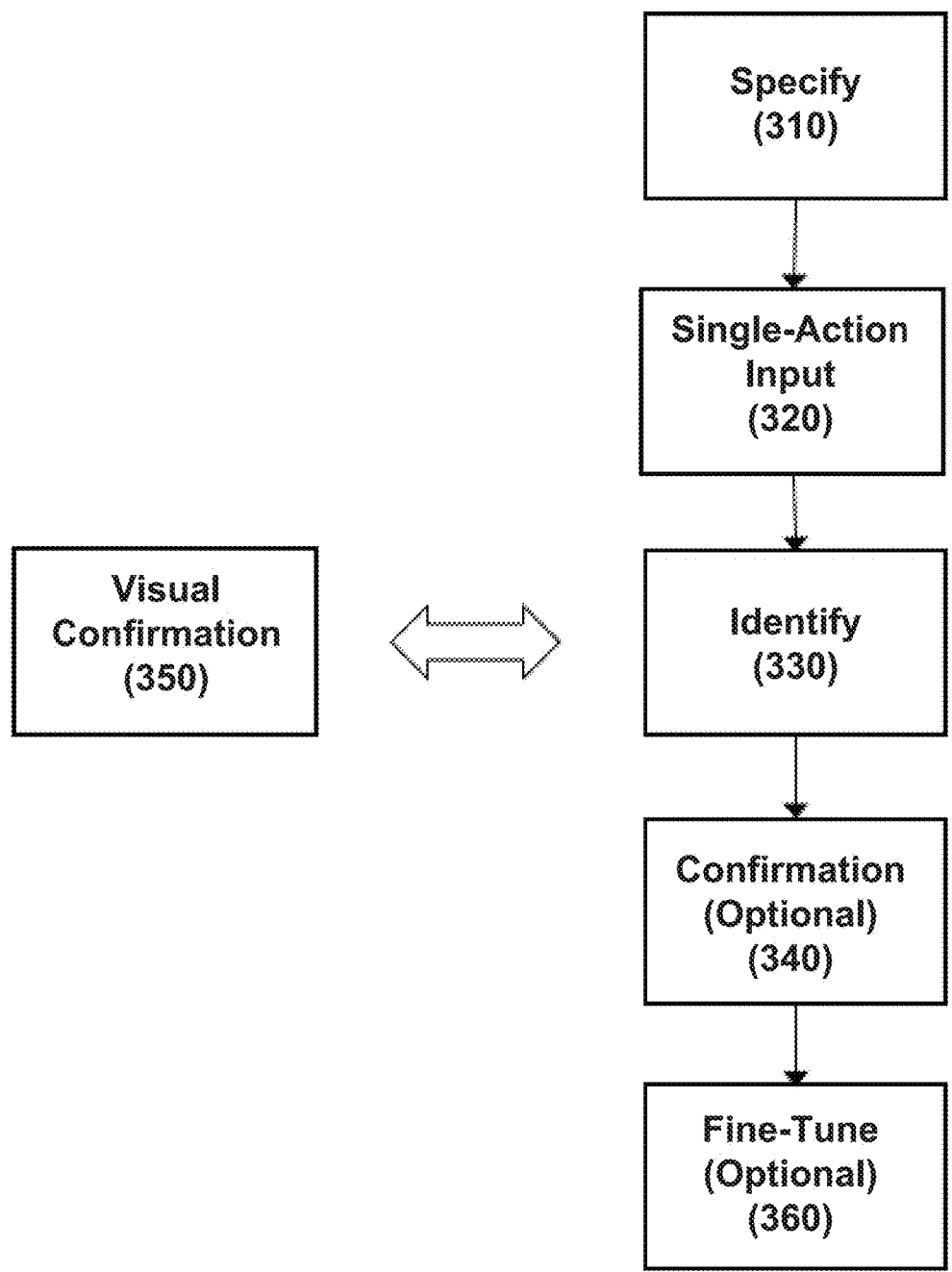
FIGS. 3A-3C are block diagrams of flow charts of an example methodology of a system for configuring a motor controller.
Figures 3B, 3C:
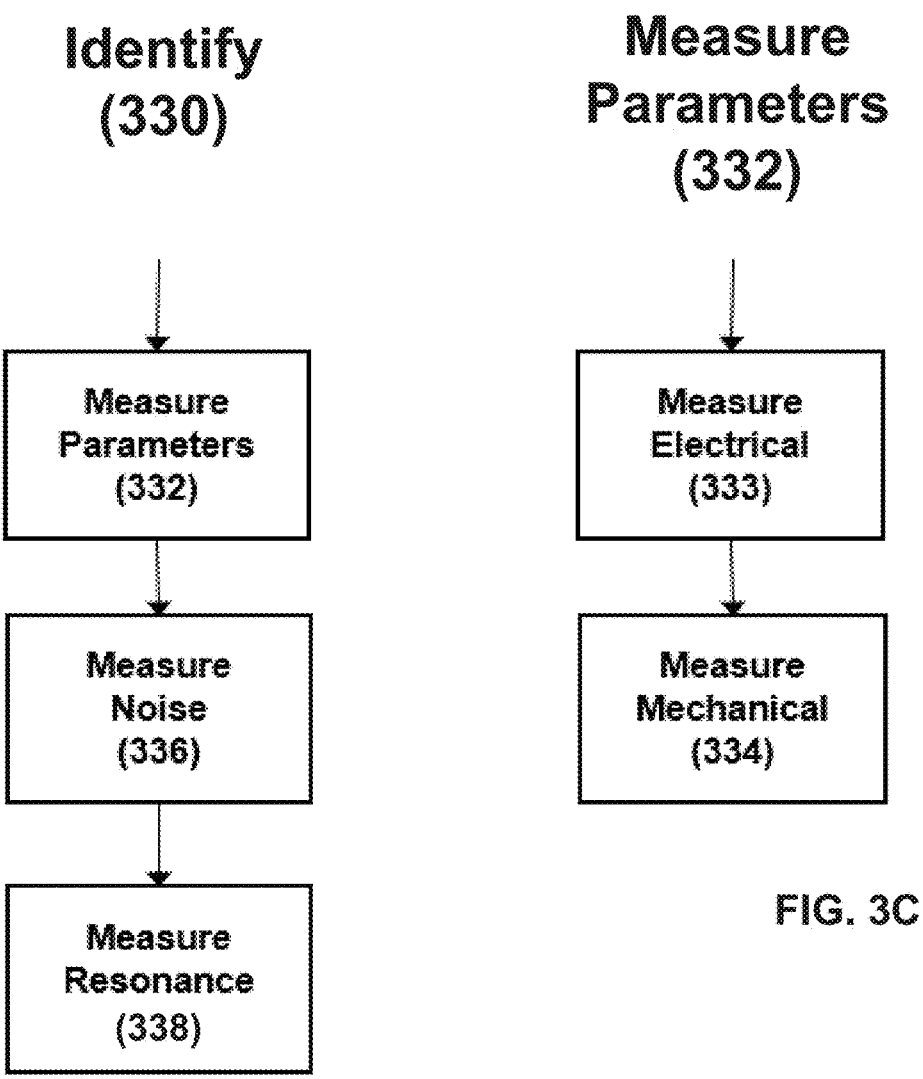

FIGS. 3A-3C are a block diagrams of a flow chart of an example methodology of a system for configuring a motor controller. FIG. 3A is an example methodology of core capability and certain optional capability. In specify step 310, a specifier component receives or obtains specification information for a motor (or other target) 120 in communication with controller 110. This specification information can be received as manual user input via interaction with GUI 220, or can be obtained through an automatic process. An example target may be a motor, such as an alternating current (AC) three-phase induction motor, a surface-mounted PMSM, or another motor or motion device. For a motor, the specification component may specify basic identification characteristics of the motor, including properties such as motor type (e.g., PMSM or induction motor), rated speed (in revolutions per minute or RPM), rated current (in Amperes), rated voltage (in Volts), pole pairs (number) and encoder lines (number). The specify step 310 may alternatively or additionally include application-specific parameters input by the user, such as settling time and overshoot (in seconds or fractions thereof) and noise (on either an absolute or relative basis).

At the conclusion of specify step 310, a control program (such as a motor control program) is retrieved or created based on the motor identification characteristics obtained by the identification component. In some embodiments, the configuration system can include an application library 250 that hosts a number of sample motor control programs or profiles, and the system may identify and retrieve one of the sample motor control programs determined to correspond to the obtained identification characteristics of the motor (or other target). In one or more embodiments, the configuration system may synthesize the sample motor control program at runtime using library components. The system can build these libraries and object models over time based on instances of successful applications used in the past, using knowledge of persons with deep domain expertise. Machine learning methods and other techniques may also be used to improve these libraries and object models.

In step 320, a single-action input receives an action from a user. With single-action identification and configuration, the user need only perform a single action (e.g., one click of a mouse button, one press or swipe of a touch-sensitive display, one press of a button, a single hand gesture with an appropriate reader, or some other single instantiation step now known or hereafter developed) to configure the motor. In response to the single action, the software transitions to an identify step 330 whereby a multi-step configuration sequence is performed identify motor and motion parameters for the system, and to run the motor according to a single optimized parameter. Thus, once the motor is physically connected to the system and identified, the user need only take a single action to complete its configuration.

FIGS. 3B and 3C show details of identify step 330. As shown in FIG. 3B, the identification sequence comprises at least three steps. The at least three steps respectively comprise measurements of system parameters 332, measurement of noise 336, and measurement of resonance 338. As shown in FIG. 3C, the measurement of system parameters 332 may include two steps, including the measurement of electrical parameters 333 and the measurement of mechanical parameters 334. For the case of a surface-mount PMSM motor, measurement of electrical parameters 333 may include measuring the motor's intrinsic electrical parameters, including resistance (in Ohms), inductance (in Henrys), and flux (in Webers). Some intrinsic electrical parameters may also be entered manually by the user via interaction with GUI 220, such as rated motor current (in Amperes) and bus voltage (in Volts). As discussed, "auto configure" or "auto tuning" functions in existing motor control software can be deployed to adequately and automatically measure electrical parameters of a motor.

Measurement of mechanical parameters 334 may include measurement of the motor's inertia, viscous friction, and coulomb friction. Inertia represents the torque required to accelerate a motion system, and considers the motor rotor, shaft, and anything directly coupled to the motor shaft (e.g., load 130) that will rotate with the motor. Inertia can be found by accelerating the motor and coupled inertia in an open loop torque test. In this test, the torque is increased at a specified rate (determined by the value for "Ramp Time") until a specified speed target is achieved ("Goal Speed"). When the speed target is reached, the torque is set to zero and begins decreasing at a specified rate (defined by Ramp Time) until a new specified speed target is achieved (Goal Speed). Once this speed target has been reached, the torque will be modified until it is zero. At this point the inertia has been calculated from the integrated speed and torque signals. This method of automatically estimating inertia is more fully described in applicant's U.S. Pat. No. 8,710,777, which is incorporated here be reference. Other techniques for estimating inertia are also within the scope of one or more embodiments of this disclosure.

Viscous friction consists of the force opposing motion that is a function of the motor's rotational speed. This force comes from the rotation of bearings inside the motor and any surfaces in the system that rub together. Viscous friction is found during the mechanical identification routine comprised of an open loop torque test that accelerates and decelerates the motor. Coulomb friction refers to the static resistive force that is inherent to the motion system when commencing rotation from rest. Coulomb friction is found during the mechanical identification routine comprised of an open loop torque test that accelerates and decelerates the motor. In some embodiments, both viscous friction and coulomb friction can be identified at the same time and may be found using the same method used for inertia identification. Methods of automatically estimating coulomb friction and viscous friction (as well as inertia) are more fully described in applicant's co-pending application, U.S. patent application Ser. No. 14/851,307, which is incorporated here be reference. Other techniques for estimating friction are also within the scope of one or more embodiments of this disclosure. Moreover, friction components other than viscous and coulomb friction may be identified in some embodiments.

After the parameter measurement step 332, the second of three identification steps in FIG. 3B is noise measurement 336. Noise is a fluctuation in a signal that obscures a true value. Noise may arise from many sources, including but not limited to quantization error, calculation precision, and electrical coupling. Noise is identified because imprecision of feedback for both speed/position and torque limits the ability to increase the controller gain to achieve optimal performance. As the noise of a system increases, the maximum possible gain for the motion controller is reduced. Additionally, too much noise in the control signal will lead to instability and degrade motor life. Also, the magnitude of noise in a system may enable automatic identification of low-pass filter frequencies that maximize suppression of identified noise without affecting control.

In one or more embodiments, open-loop speed/position measurement can be used to measure noise. The open-loop measurements are captured while the system is commanded to run at a specified speed via the following process: While running in closed-loop speed/position control with a conservative robust bandwidth and with a commanded steady state speed, data for speed/position feedback, torque feedback, and torque command are collected. The third element of the dataset, the torque required to spin the motor at approximately the commanded speed, is then provided as the reference to the current controller and the system is placed into open-loop speed/position control. Speed/position feedback data are collected at this steady state. The feedback data are processed through a high-pass filter to remove the DC offset and the absolute maximum value for observed speed/position noise is subsequently determined. Other techniques for estimating noise are also within the scope of one or more embodiments of this disclosure.

The third of three identification steps in FIG. 3B is resonance measurement 338. Resonance refers to a natural frequency in a motion system that if excited produces unwanted mechanical oscillations. Resonant frequencies may be specified with the unit [radians/second]. The sharpness of resonance may be specified by a dimensionless quality, or "Q", factor. Mechanical oscillations due to resonance can lead to instability and system damage if the resonant frequencies are excited. Even if resonant frequencies are known and simply avoided, this may limit system performance because of the constraint placed on the motion controller's aggressiveness. Better performance therefore occurs when resonant frequencies are known and actively suppressed.

Two elements of resonance need to be identified to allow for suppression: frequency and Q factor. These can be determined while the system is running in open-loop speed/position control according to the following process: The system is commanded to run at a specified speed and the amount of torque required to maintain that speed is captured. This torque value is provided as the reference to the current controller and the system is placed into steady state open-loop speed/position operation. Noise is then injected into the torque reference signal, and speed/position feedback is collected to determine how much injected torque noise produces a meaningful amount of speed/feedback noise for the resonance identification. Once the appropriate amount of torque noise is found, the speed/position feedback and torque feedback are collected. A Fast Fourier Transform (FFT) is run on the feedback signals and the resulting frequency data is processed to discover peaks (and the frequencies at which they occur) in the resonance transfer function. The nature of the identified peaks comparing torque feedback to speed feedback is then used to determine the Q factor. The identification routine can be used to identify an arbitrary number of resonant frequencies. For simplicity of implementation, some embodiments may consider only the two lowest resonant frequencies for suppression. This method of automatically estimating resonance is more fully described in applicant's co-pending application, U.S. patent application Ser. No. 15/259,586, which is incorporated here be reference. Other techniques for estimating resonant frequencies can also be used without departing from the scope of one or more embodiments of this disclosure.

Returning now to FIG. 3A, at the conclusion of identify step 330, the system computes a single parameter for driving the motor (or other target) from the data set comprising motor parameters, noise, and resonance. That single computed parameter may be, for example, a recommended bandwidth. The recommended bandwidth refers to a bandwidth value automatically generated by the system that meets user specified performance criteria and avoids automatically identified system constraints while balancing performance and robustness. Calculation of the recommended bandwidth enables optimized performance of the motion system while eliminating the burden on the user to empirically determine an appropriate bandwidth. This step enables single-action identification and configuration. One method for computing recommended bandwidth is finding the geometric mean of the minimum and maximum bandwidths (although other techniques may be used without departing from the scope of one or more embodiments of this disclosure).

Minimum bandwidth refers to the smallest allowed bandwidth that meets the default or user-specified performance criteria for settling time and maximum deviation, which can be optional parameters obtained in specify step 310. The settling time design criteria may be defined as the time from the start of a maximum deviation during a rated torque disturbance until the speed or position is within 10% of a maximum deviation of the speed or position set point. The maximum deviation criteria is defined as the largest error from the speed or position set point during a rated torque disturbance, where rated torque is determined by inverter capacity. The value can be scaled if the disturbance magnitude is not equal to rated torque. Maximum deviation is a specific definition of the behavior colloquially known as "overshoot" in motor control theory. Maximum bandwidth refers to the largest allowed bandwidth that does not: exceed the user-specified or default maximum torque noise; approach the inner control (current) loop bandwidth; nor encroach on the identified resonant frequencies. This method of automatically estimating a recommended bandwidth is more fully described in applicant's co-pending application, U.S. patent application Ser. No. 15/294,996, which is incorporated here be reference. Other techniques of estimating recommended bandwidth can also be used without departing from the scope of one or more embodiments of this disclosure. In one or more embodiments, minimum bandwidth and maximum bandwidth may be computed and presented to the user, and the system allows the user to select a chosen bandwidth between the two.

In confirmation step 340 and using the recommended or selected bandwidth from identify step 330, a confirmatory operation step may be performed to confirm operation of the target to be controlled in the motor control system. Confirmation step 340 may be launched automatically, or upon receipt of a second start command from the user via GUI 220. The start command may also be a confirmatory enter, tab, mouse click, key press, or the like following computation of the single parameter in identify step 330. An additional parameter may optionally be provided for the confirmation step 340. For an exemplary motor, such additional parameter may be a target speed for the motor, entered in revolutions per minute. The confirmation operation may involve, for example, sending the adapted motion control program to the controller 110 using motion control interface 230, and running the motor based on the recommended bandwidth and in accordance with the parameter (e.g., a target speed) entered by the user or set as a default. In some embodiments, operation of the motor can also be fine-tuned through step 360.

Visual confirmation in step 350 occurs throughout the identification and configuration process, applying to each of the steps on the right-hand side of FIG. 3A. For steps 310-330, example graphical interface displays are shown and discussed in FIGS. 4A-4H and 5. For step 340, the example graphical displays depicted in FIGS. 7A-7B provides a reference. For step 360, as discussed in more detail below in connection with the example interface display depicted in FIG. 6, the motor controller may optionally be tuned for additional performance enhancement. As discussed, in some embodiments the feedback presented to a user by the system 202 can be auditory or haptic instead of visual, for the benefit of users who may not be able to see a display due to visual impairment or project demands. For simplicity, the system 202 is described herein using example visual screen shots, although other views and techniques may be used.

Figure 4A:
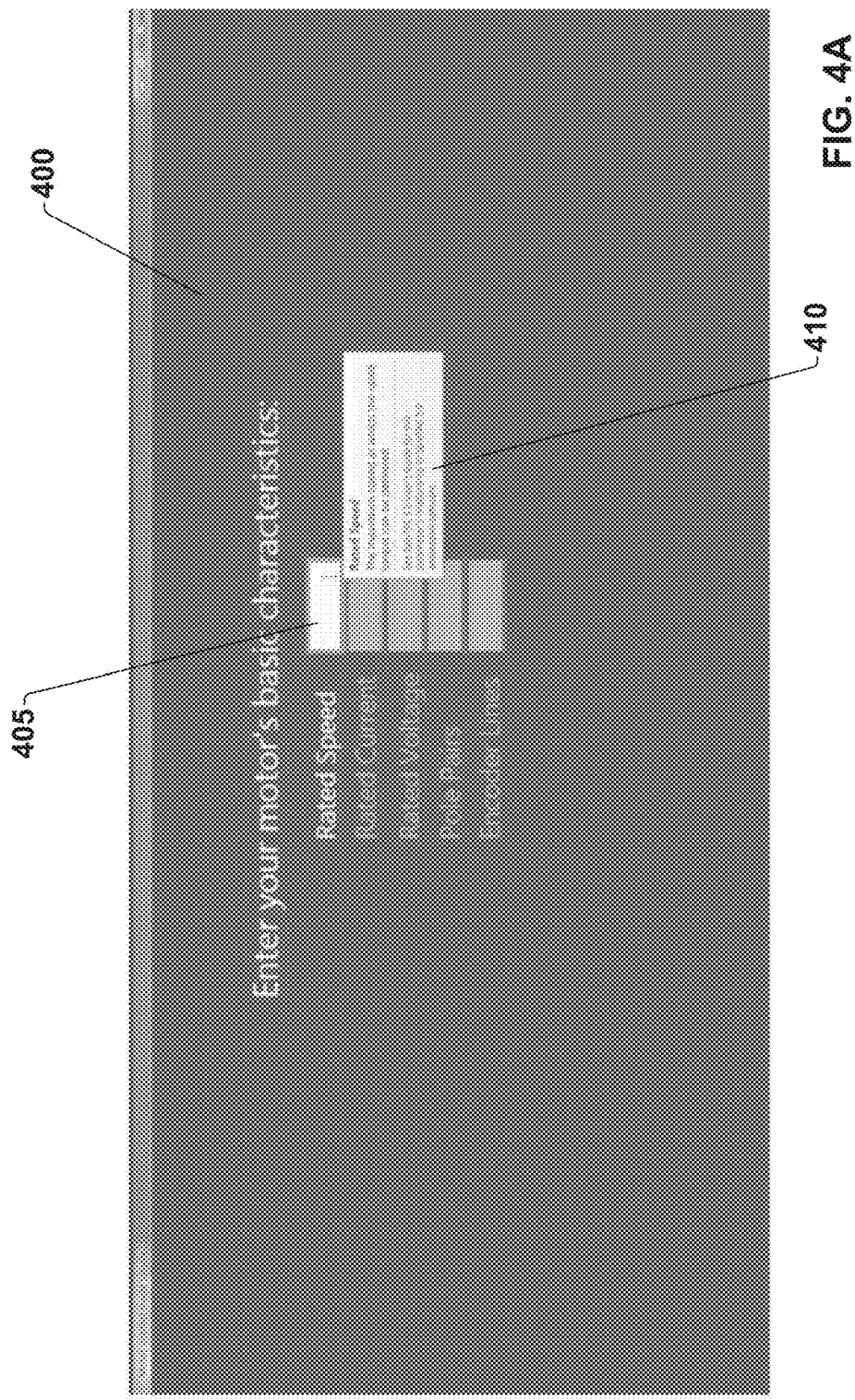
FIGS. 4A-4J are example screen shots that can be rendered in a single-action identification and configuration of a motor controller.
Figure 4B:
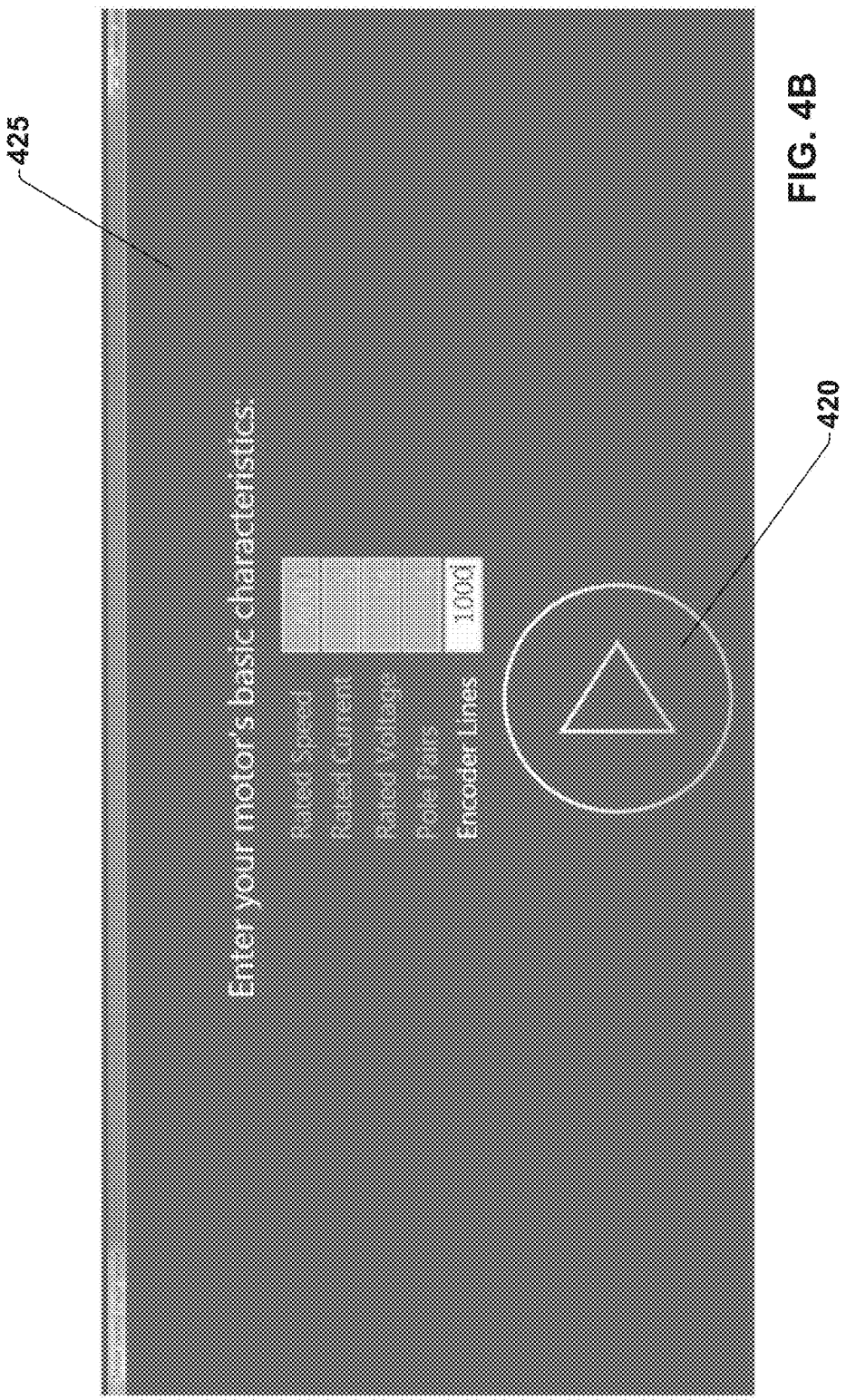

FIGS. 4A-4H are screen shots of example interface display windows that can be rendered via GUI 220 onto display 105 for single-action identification and configuration of a controller. Window 400 can be rendered in a typical display window used in the context of computer systems. The interface of computer system 100 may be used for the control of motion device 120 through controller 110. The GUI 220 operates to generate the contents of window 400 and the other exemplary interface displays on display 105. Window 400 of FIG. 4A is associated with specify step 310, and includes a data entry windows 405 that allow a user to input basic characteristics of the motor. As discussed above in connection with specify step 310, identification characteristics that can be specified via data entry windows 405 can include properties such as rated speed (in revolutions per minute or RPM), rated current (in Amperes), rated voltage (in Volts), pole pairs (number), and encoder lines (number). The identification characteristics may include additional or alternative parameters (shown in FIG. 4J) relating to the performance of the system, such as settling time and overshoot (in seconds or fractions thereof), and noise (as either an absolute or relative measure). In some embodiments, the system can render explanatory information for each characteristic. In the example depicted in FIG. 4A, a pop-up window 410 has been rendered on window 400 in response to a determination by the system 202 that the user has hovered the cursor over the Rated Current entry window, where pop-up window includes text providing additional information about the Rated Current characteristic. Also, in some embodiments, the system 202 can be configured to retrieve at least a subset of the identification characteristics for the motor automatically as an alternative to manual entry of those identification characteristics. FIG. 4B is a screen shot of window 425 at the completion of the specify step 310. As can be seen in FIG. 4B, after all of the motor's basic characterization information has been entered, an action button 420 is rendered. Interaction with action button 420 initiates single-action identification and configuration as provided in step 320.

Figure 4C:
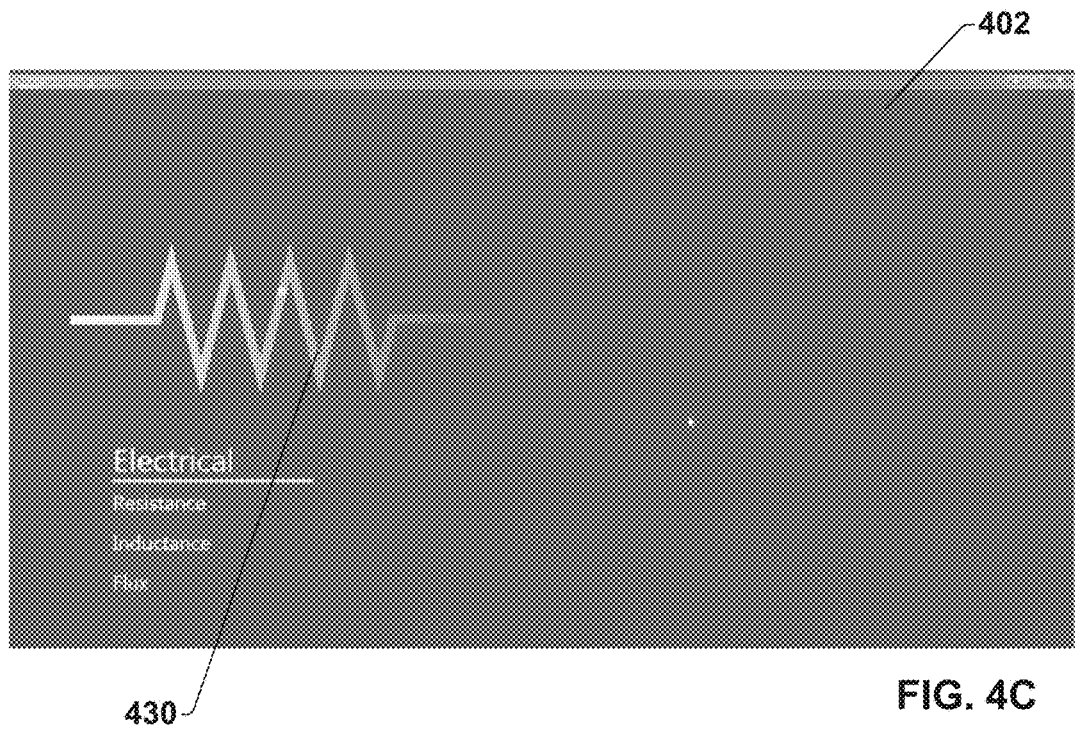
Figure 4D:
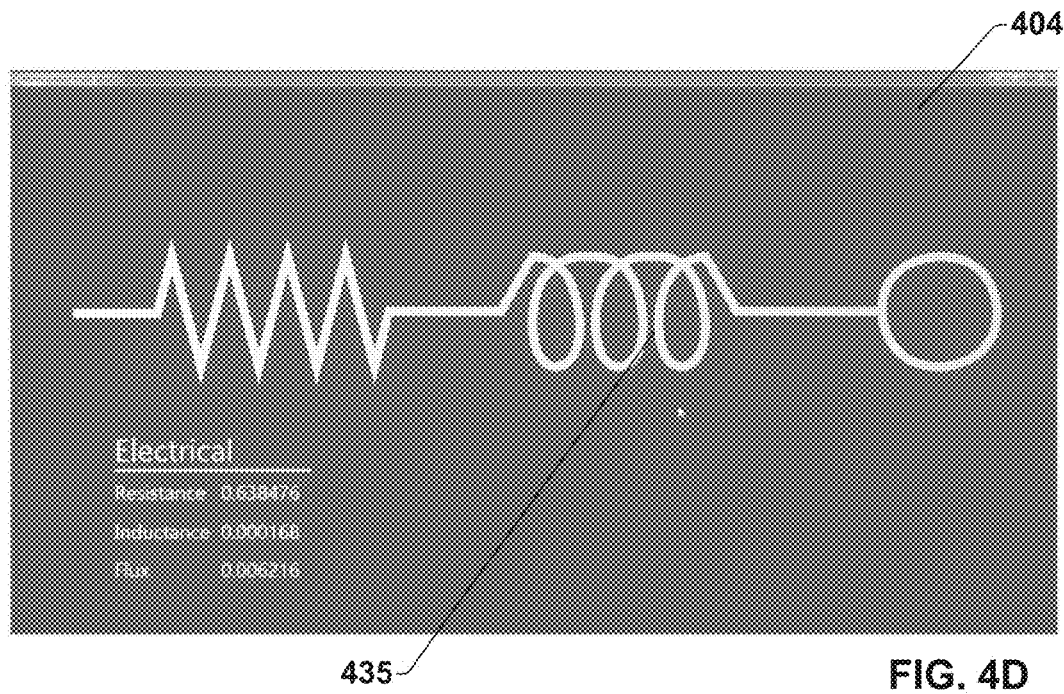
Figure 4E:
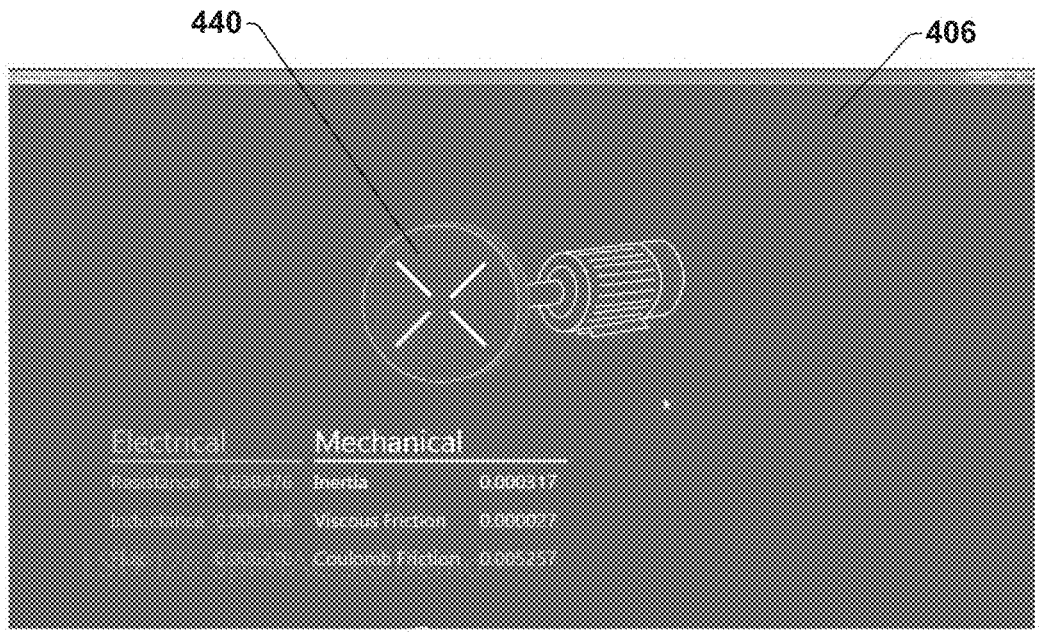
Figure 4F:
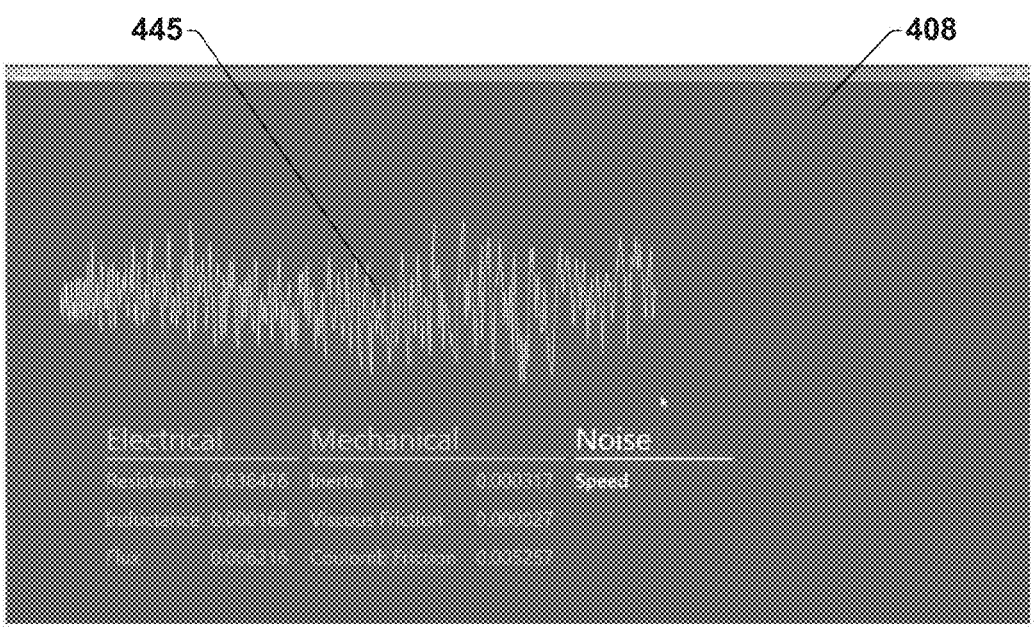
Figure 4G:
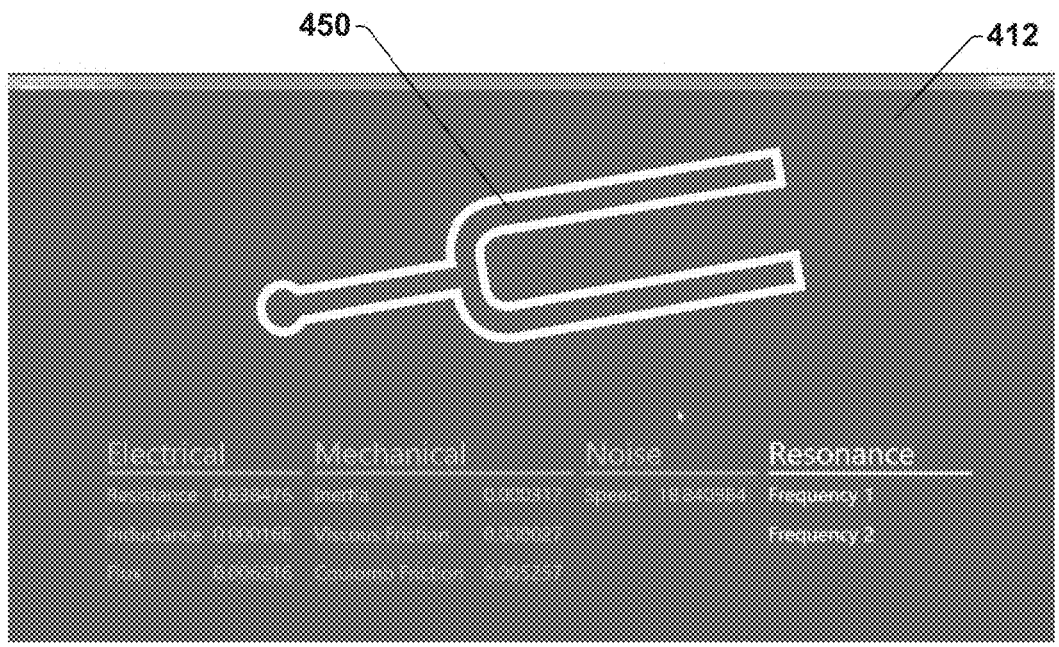
Figure 4H:
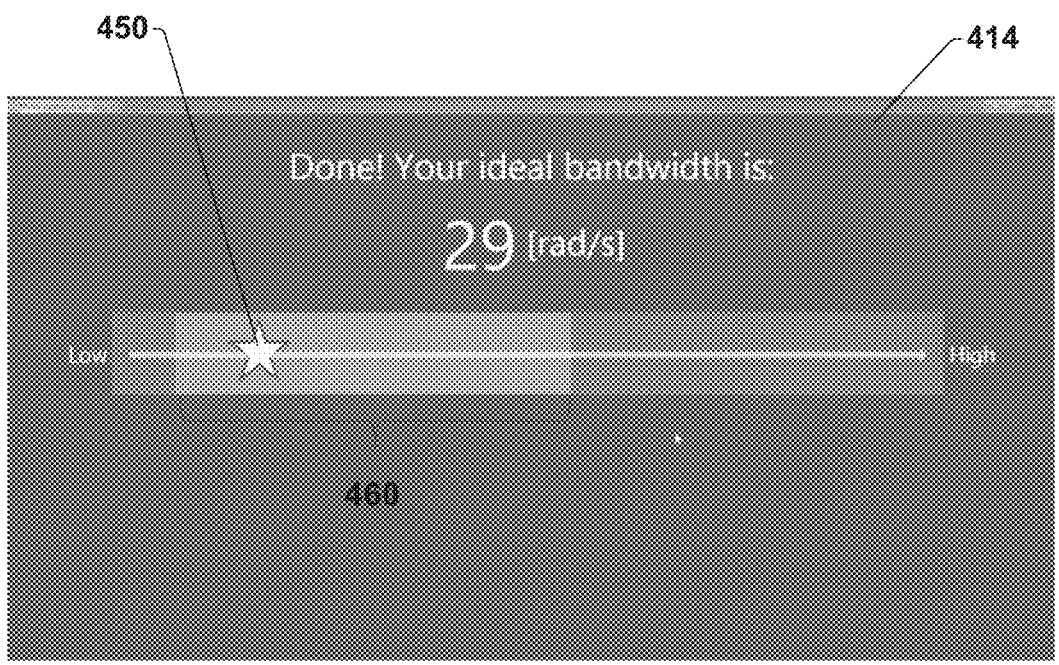

The graphical displays depicted in FIGS. 4C-4H, or their equivalent, can then be presented by the system 202 without further user input to indicate progress through the single-action identification and configuration steps comprising identify step 330, as further broken into its constituent steps depicted in FIGS. 3B and 3C. The first of three steps, parameter measurement 332, is represented by display windows 402, 404, and 406 in FIGS. 4C-4E. In particular, display windows 402 and 404 depicted in FIGS. 4C and 4D illustrate step 333 for electrical parameter measurement, while display window 406 depicted in FIG. 4E can be shown in connection with step 334 for mechanical parameter measurement. The second of three steps, noise measurement 336, can be represented by display window 408 illustrated in FIG. 4F. The third of three steps, resonance measurement 338, can be represented by display window 412 illustrated in FIG. 4G. In some embodiments, these display windows can support animation, so that a user is apprised of an ongoing, running process. For example, a virtual electron graphic 430 on display window 402 (FIG. 4C) may scroll across the screen to reveal a stylized picture 435 (display window 404 of FIG. 4D) of resistive, inductive and flux elements as work is being performed. In another example, a motor wheel graphic 440 on display window 406 (FIG. 4E) can rotate as mechanical parameters are being computed. In yet another example, the system 202 can draw a noise graphic 445 on display window 408 (FIG. 4F) as an active plot from one side of the display window 408, or as active static as noise measurements are being computed. On display window 412 of FIG. 4G, a tuning fork graphic 450 can be rendered with vibration animation as resonance measurements are being computed. On display window 414 of FIG. 4H, a recommended bandwidth graphic 455 and bandwidth range graphic 460 can fluctuate between low and high boundaries on the display window 416 and eventually settle on the computed bandwidth and bandwidth range values as a final calculation is reached. The fluctuations can mirror an ongoing calculation, or may be unrelated to an ongoing calculation, i.e., presented as a cartoon or animation to indicate progress to the user.

Figure 5:
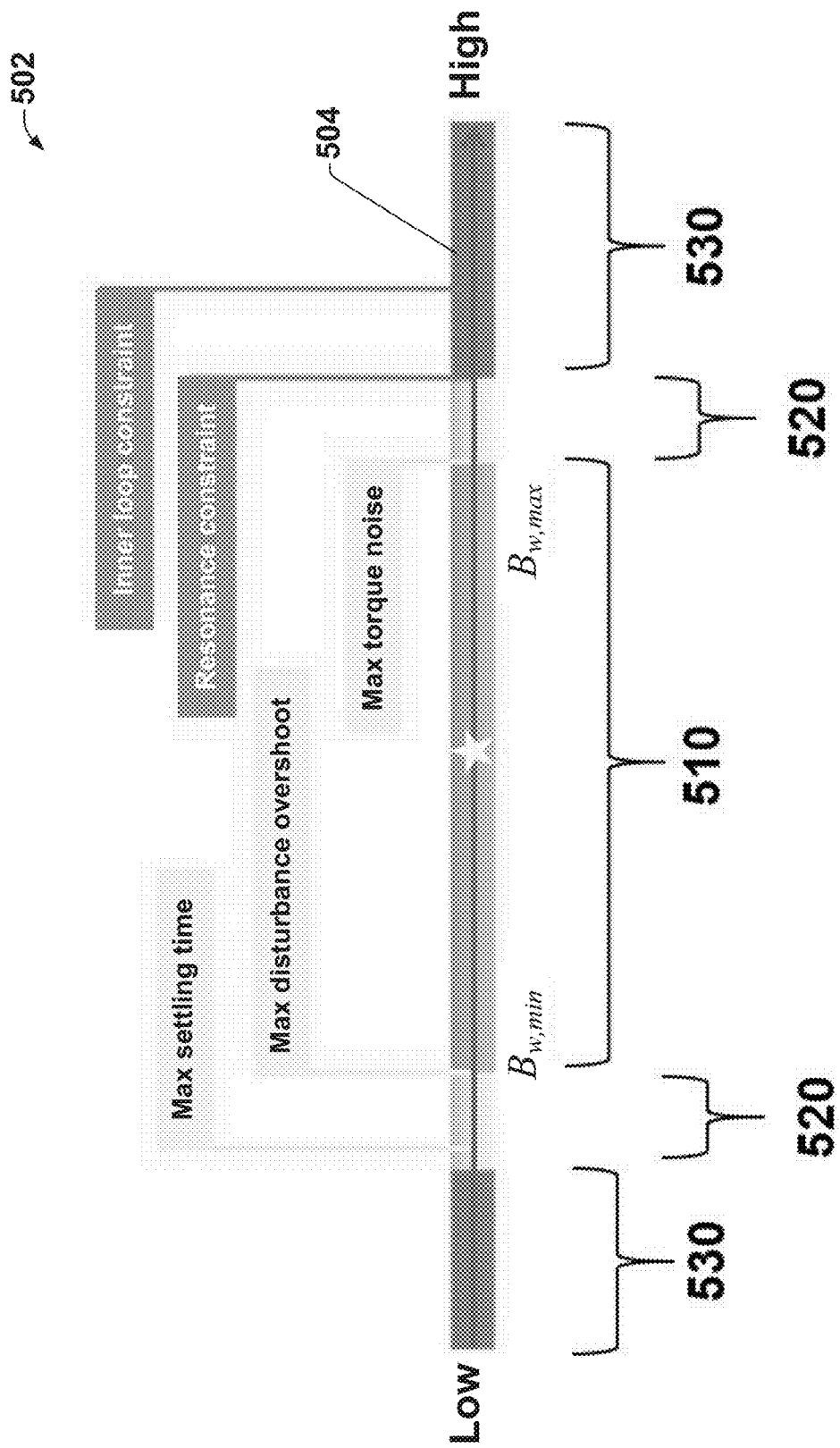
FIG. 5 is an optional representation of bandwidth that provides more detailed information to a user.

Although not shown, less information or more information may be provided to a user via the GUI 220. For example, in some embodiments the display can comprise a single LED. In an example of such an implementation, one LED can blink while the identification and configuration steps are being performed and resolve to solid to indicate that the process successfully concluded and computed a single tuning parameter. A multi-color LED could provide greater detail on process flow than a single-color LED. In another embodiment, such as a segment display used in a motor drive, system 202 could provide the recommended bandwidth as a number rather than as a graphic. In other embodiments, progress can be illustrated using an hour glass, progress bar, or pie chart gauge. Some embodiments can comprise display windows that are more visually complex than those shown in FIGS. 4A-4H. For example, graphic 502 depicted in FIG. 5 may be used instead of the graphic shown on display window 414 of FIG. 4H to show permissible bandwidth range, a recommended bandwidth, and additional tuning constraints. Regions within the bandwidth scale 504 can be color-coded on a suitable display 105. For example, permissible operating range 510 may be green, marginal operating range 520 may be yellow, and restricted range 530 may be red. Graphic 502 of FIG. 5 is just one of many optional representations of bandwidth that can be rendered by GUI 220 to provide more detailed information to a user.

After the motor is configured, it can be run. FIGS. 7A-7B are screen shots of example graphs 702 and 704 that can be generated by GUI 220 in an optional module to render a real-time plot of feedback over time to display 105. FIG. 7A is a graph 702 plotting the speed of an example motor over a running time of 5.0 seconds. The x-axis represents time in seconds. The y-axis represents rotation of the motor in revolutions per minute (RPM). In this example, the sampling rate is 10 times per second, yielding 50 total data captures. Example graph 702 depicts rotational speed of the motor during a start-up phase in which the motor is launched from standstill to a steady state of 750 RPM, taking approximately one second to reach this steady state. The line on the graph with samples shown by filled circles plots the measured feedback speed of the motor. The reference speed may also be represented in the graph 702 as a separate line with separate markers. In the example scenario plotted in FIG. 7A, measured speed and reference speed are identical, so the reference speed is visually obscured.

FIG. 7B depicts a graph 704 plotting the speed of a similar motor that has been running for 9.0 seconds in a steady state mode of 750 RPM with a variable load applied during that period. The x-axis represents time in seconds. The primary y-axis represents rotation of the motor in RPM. The secondary y-axis represents torque on the motor. Torque may be shown in relative terms such as a percentage or ratio of rated capacity. Torque may alternatively be shown in absolute terms such as Newton-meters or pound-feet. Again, the sampling rate is 10 times per second, yielding 90 total data captures. Line 706 on graph 704 with samples shown by filled circles plots represents measured feedback speed of the motor, corresponding to the primary y-axis. Line 708 on graph 704 with samples shown by open triangles plots measured torque of the motor, corresponding to the secondary y-axis. In the illustrated example, six disturbances or variable loads are applied, at a rate of approximately one disturbance per second from the 3- to 8-second marks. The measured rotation rate stays constant at 750 RPM. As in the FIG. 7A, measured speed and reference speed are identical, so any indication of reference speed is visually obscured.

Figure 6:
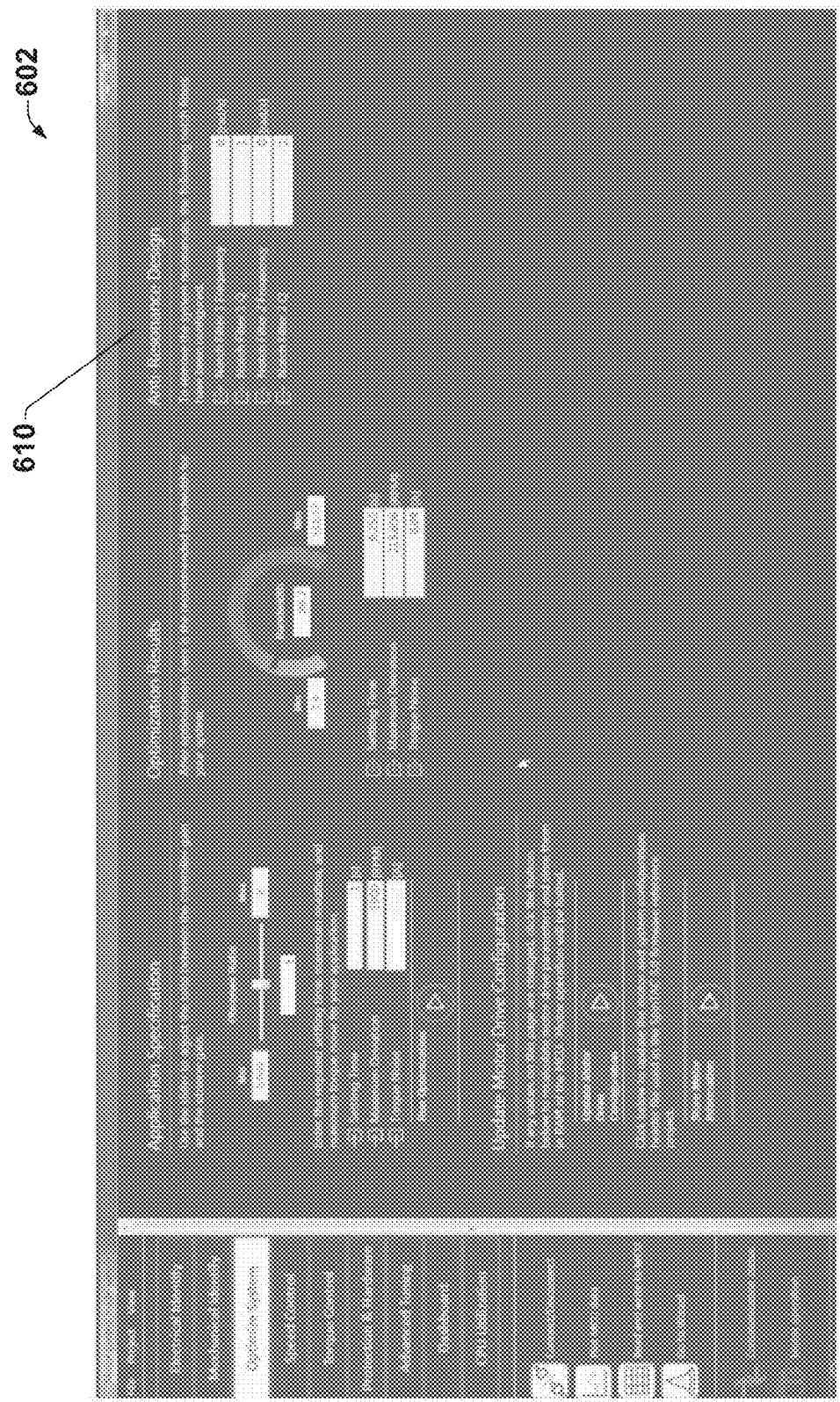
FIG. 6 is an example screen shot that shows optional parameters for configuration and additional tuning.
Figure 7A:
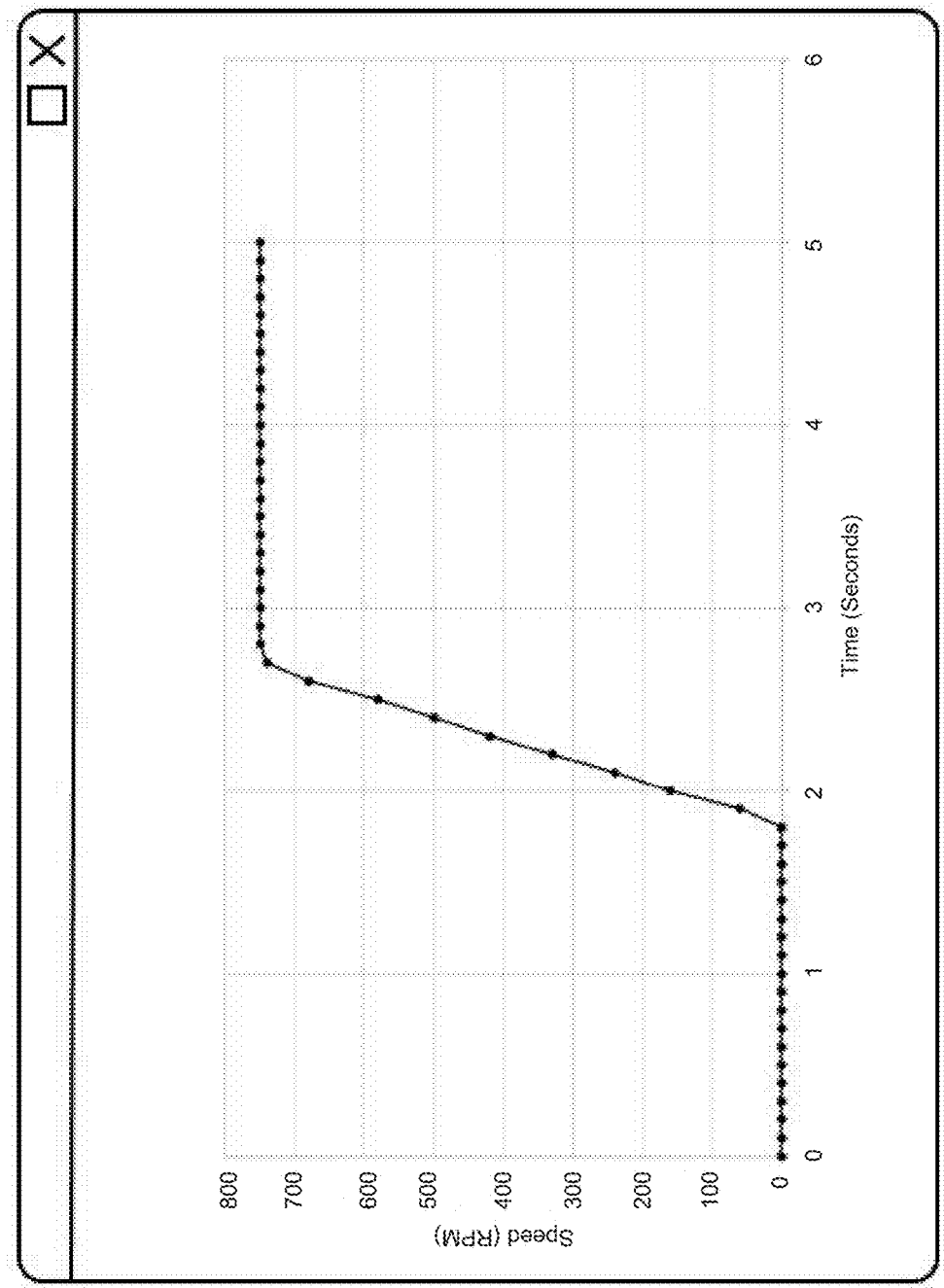
FIGS. 7A-7B are example screen shots that can be generated by an optional module to provide a real-time plot of feedback over time.
Figure 7B:
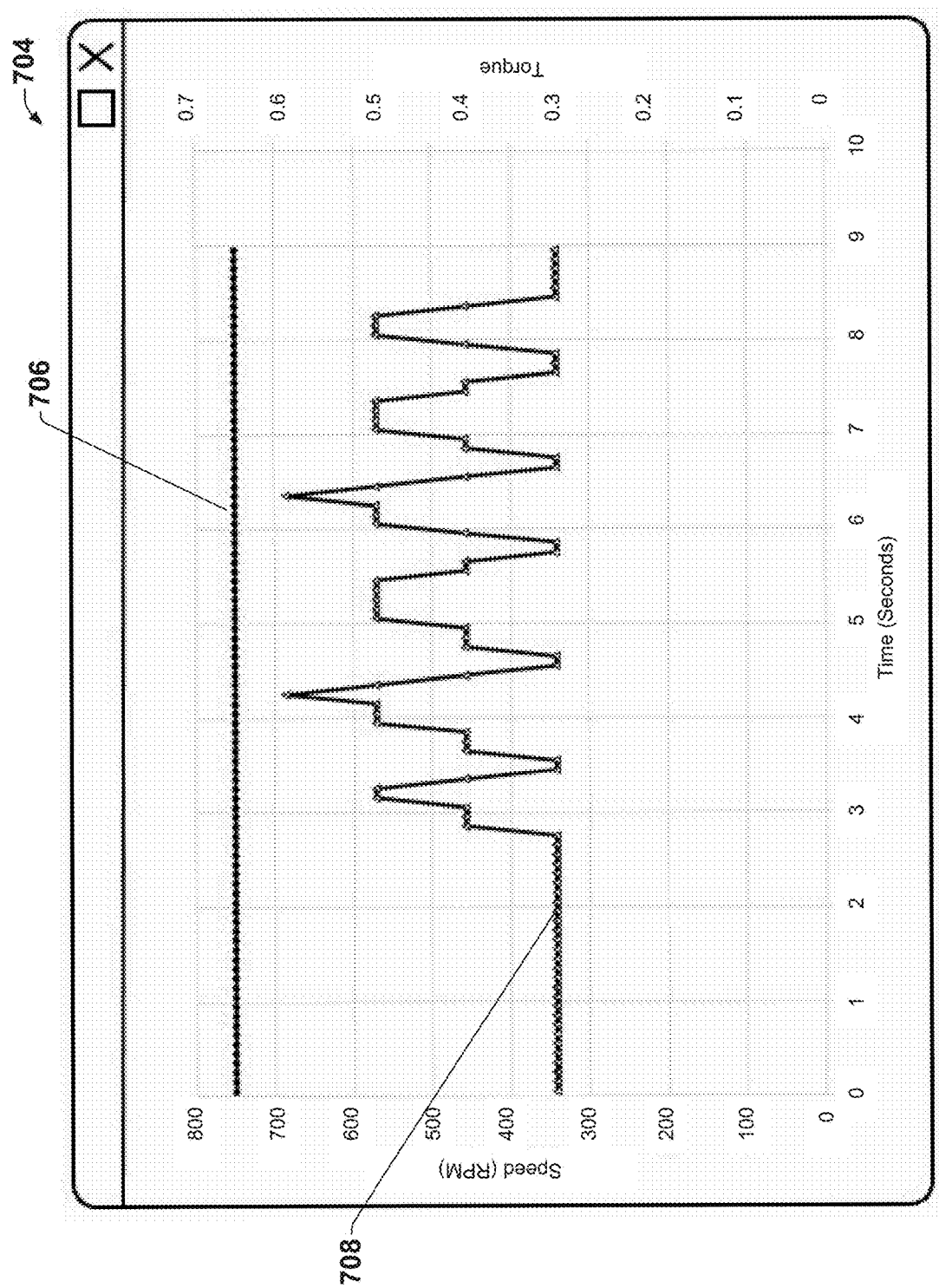

FIG. 6 is a screen shot of an example display window 602 that shows optional parameters for configuration and fine tuning. Additional features can provide further benefits. For example, the system 202 may optionally include a notch filter configuration component that can be configured via notch filter configuration area 610. The introduction of a notch filter together with low pass filtering can attenuate a narrow range of frequencies from a signal around a resonant peak. In the absence of a notch filter, the upper bound for the bandwidth of the motor controller may need to be limited to avoid exciting resonant frequencies, thereby reducing achievable performance. Automatic notch filter configuration is therefore useful to appropriately address resonance where it is a concern. In one or more embodiments, notch filters can be automatically configured for the two resonant frequencies computed in step 338. Notch filter configuration area 610 enables a user to disable or alter these default notch filters. Although it has generally been found that two resonant frequencies should be computed, some embodiments can compute more or fewer resonant frequencies and thus more or fewer notch filters.

Selection tab 620 shows additional options for fine-tuning the motor controller system. The "Advanced Tuning" tab in selection tab 620 can enable application-specific tuning of the system for advanced users (not shown). For example, it is known that motors experience unique challenges in marine propulsion applications, which may dictate that certain motor control parameters should be set to be within certain preferred ranges to yield acceptable or substantially optimized performance in such applications. Flying start is a condition wherein a drive attempts to control an already spinning motor. If the intended application domain is marine, the system 202 can render a check-box that allows a user to fine-tune the motor control application by enabling (with a check) or disabling (without a check) flying start for the motor control application.

In an embodiment, the motion control system for a motor may be extended to the control of other physical parameters, other devices, or higher order systems. The area of process control for industrial systems is one such example. As a specific example, a motor may be used for the indirect control of a pump or a valve in applications such as water and wastewater management, oil and gas, or specialty chemicals. In such applications, it is typical to regulate pressure or flow rate instead of motor speed or motor current. However, there will be a correlation between the motor and the pump or valve being actuated by the motor as part of an extended system. More specifically, the single parameter selected for operation of the motor, such as bandwidth, will relate to the performance of the pump or valve as measured by its gain, settling time and dead time. In a pressure control system, the gain refers to the ratio of change in the pressure feedback value (output) compared to the magnitude of the speed command for the motor (the input intended to change the pressure). The settling time, or tau ($\tau$), typically refers to the amount of time it takes for the pressure control system to reach $1\text{-}e^{-1}$ (or approximately 63.2%) of its steady state operation, given an input stimulus or other disturbance. The dead time typically refers to the amount of time it takes for the pressure control system to begin to change from $t_0$, given the input stimulus or other disturbance.

Figure 4I:
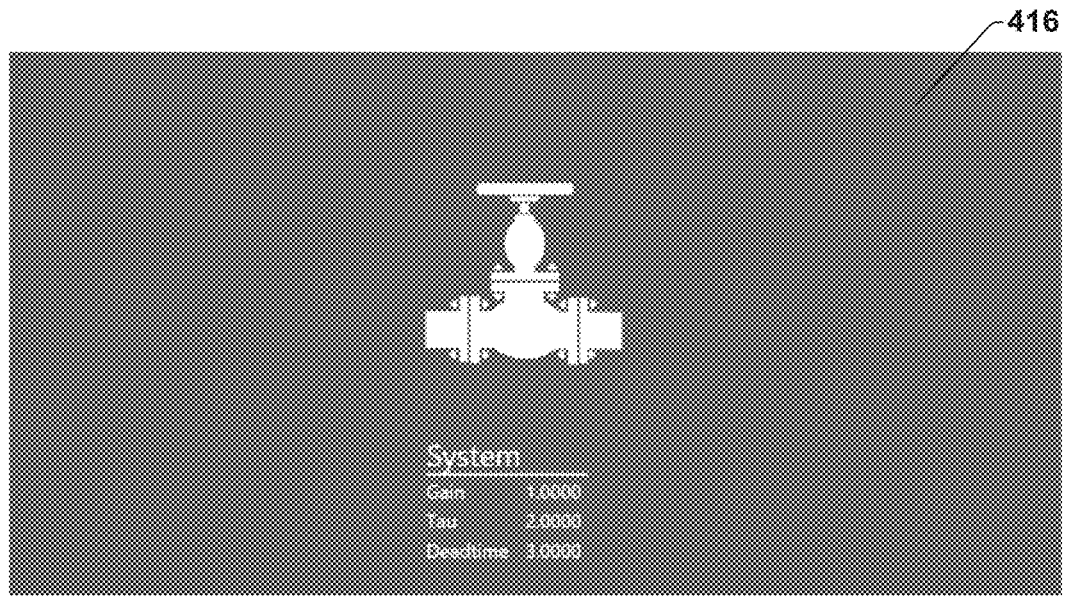
Figure 4J:
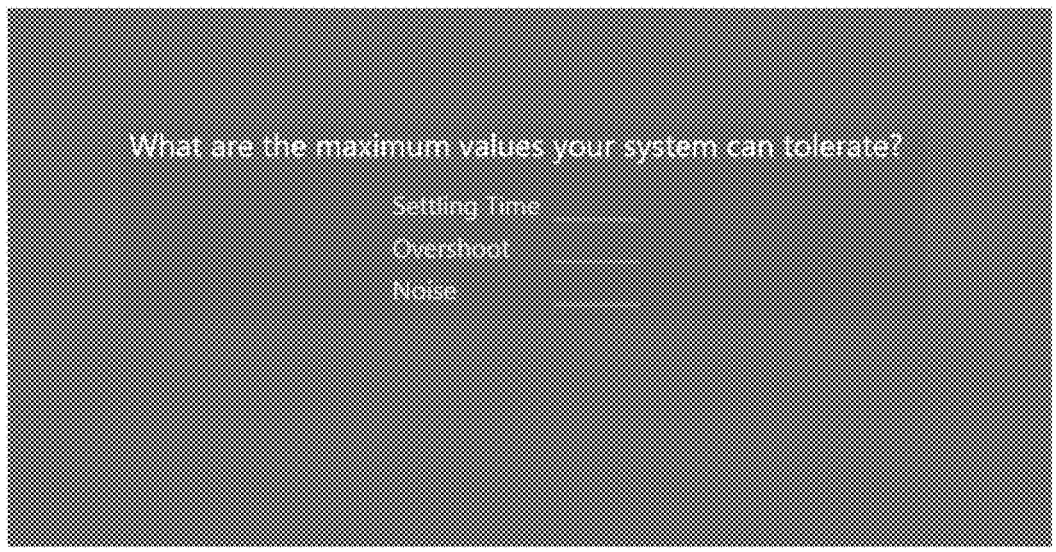

The one-click identification and configuration process enabled by system 202 can be extended to the process control example where there is indirect control of the pump or valve. The single-action identification and configuration sequence comprises steps to establish a single parameter for driving the motor. Without additional action by the user, the single-action identification and configuration sequence further includes a step in which the application of that motor parameter is correlated to operation of the pressure control system, and the factors of gain, settling time, and dead time are computed. FIG. 4I is a screen shot of an example display window 416 that can be optionally be presented via GUI 220 without further user input to indicate progress through the single-action identification and configuration sequence for the process control example. In addition to this process control example, it will be appreciated that the invention can be applied to the control of other types of motion devices.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments of the one-click motor identification and configuration system described herein can be implemented in any computer system or environment having any number of memory or storage units (e.g., memory of computer 100 of FIG. 1), and any number of applications and processes occurring across any number of storage units. This includes, but is not limited to, an environment with server computers and client computers deployed in a network environment or a distributed computing environment, having remote or local storage. For example, with reference to FIG. 2, the GUI 220, system software 210, motion control interface 230, software wizard 200, and application library 250 can be stored on a single memory (e.g., a memory of computer 100) associated with a single device (e.g., computer 100), or can be distributed among multiple memories associated with respective multiple devices. Similarly, GUI 220, system software 210, motion control interface 230, software wizard 200, and application library 250 can be executed by a single processor (e.g., a processor of computer 100), or by multiple distributed processors associated with multiple devices.

Distributed computing provides sharing of computer resources and services by communicative exchange among computing devices and systems. These resources and services include the exchange of information, cache storage and disk storage for objects. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 8:
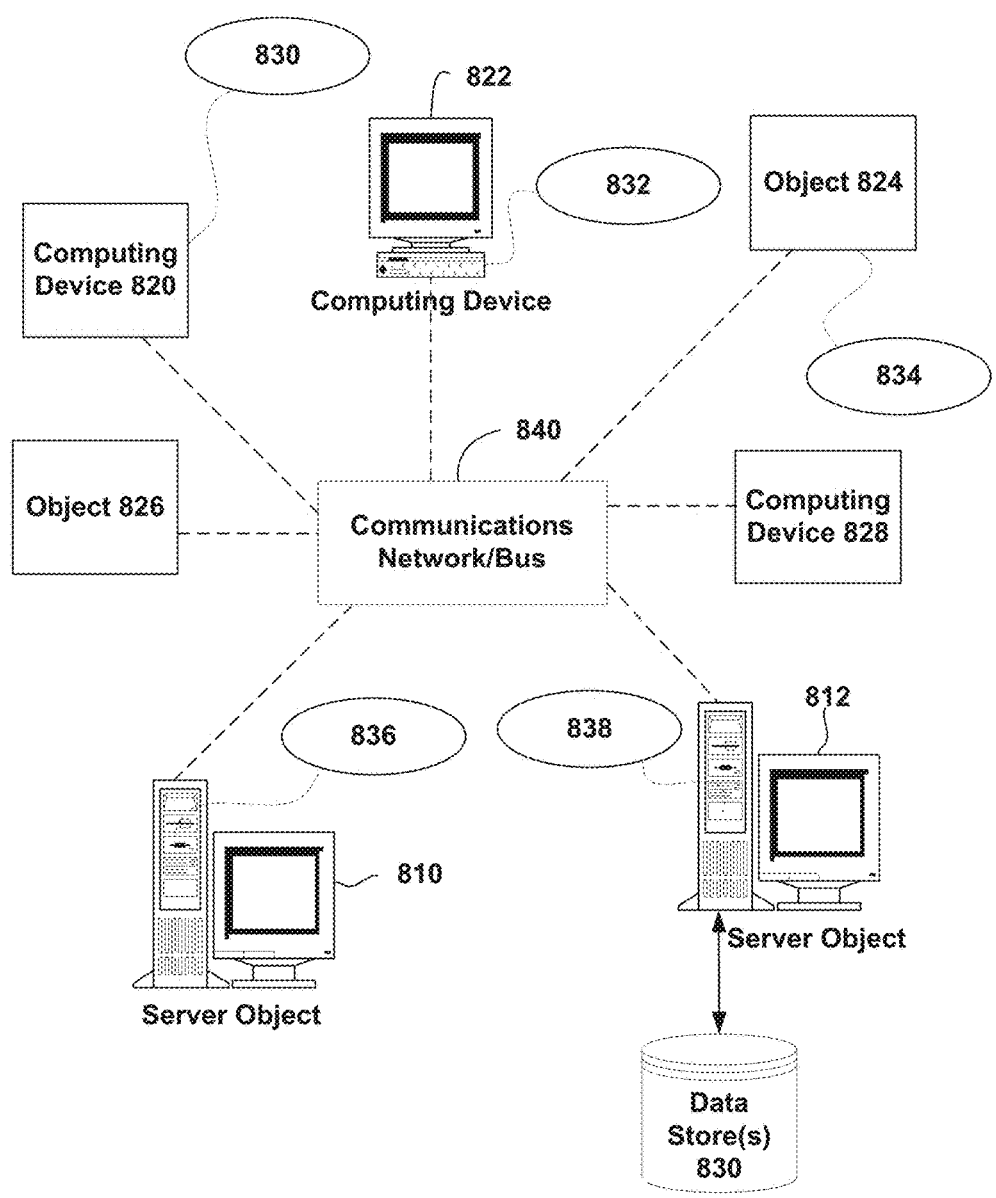
FIG. 8 is a block diagram representing an exemplary networked or distributed computing environment for implementing one or more embodiments described herein.

FIG. 8 provides a schematic diagram of an exemplary networked or distributed computing environment. The distributed computing environment includes computing objects 810, 812, etc. and computing objects or devices 820, 822, 824, 826, 828, etc., which may include programs, methods, data stores, programmable logic, etc., as represented by applications 830, 832, 834, 836, 838. It can be appreciated that computing objects 810, 812, etc. and computing objects or devices 820, 822, 824, 826, 828, etc. may comprise different devices, such as personal digital assistants (PDAs), audio/video devices, mobile phones, MP3 players, personal computers, laptops, tablets, etc., where embodiments of the inertia estimator described herein may reside on or interact with such devices.

Each computing object 810, 812, etc. and computing objects or devices 820, 822, 824, 826, 828, etc. can communicate with one or more other computing objects 810, 812, etc. and computing objects or devices 820, 822, 824, 826, 828, etc. by way of the communications network 840, either directly or indirectly. Even though illustrated as a single element in FIG. 8, communications network 840 may comprise other computing objects and computing devices that provide services to the system of FIG. 8, and/or may represent multiple interconnected networks, which are not shown. Each computing object 810, 812, etc. or computing objects or devices 820, 822, 824, 826, 828, etc. can also contain an application, such as applications 830, 832, 834, 836, 838 (e.g., one-click motor identification and configuration system 202 or components thereof), that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 8, as a non-limiting example, computing objects or devices 820, 822, 824, 826, 828, etc. can be thought of as clients and computing objects 810, 812, etc. can be thought of as servers where computing objects 810, 812, etc. provide data services, such as receiving data from client computing objects or devices 820, 822, 824, 826, 828, etc., storing of data, processing of data, transmitting data to client computing objects or devices 820, 822, 824, 826, 828, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 840 is the Internet, for example, the computing objects 810, 812, etc. can be Web servers, file servers, media servers, etc. with which the client computing objects or devices 820, 822, 824, 826, 828, etc. communicate via any of a number of known protocols, such as the hypertext transfer protocol (HTTP). Computing objects 810, 812, etc. may also serve as client computing objects or devices 820, 822, 824, 826, 828, etc., as may be characteristic of a distributed computing environment.

Exemplary Computing Device

As mentioned, advantageously, the techniques described herein can be applied to any suitable device. It is to be understood, therefore, that handheld, portable and other computing devices and computing objects of all kinds are contemplated for use in connection with the various embodiments. Accordingly, the below computer described below in FIG. 9 is but one example of a computing device. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 9 thus illustrates an example of a suitable computing system environment 900 in which one or aspects of the embodiments described herein can be implemented, although as made clear above, the computing system environment 900 is only one example of a suitable computing environment and is not intended to suggest any limitation as to scope of use or functionality. Neither is the computing system environment 900 be interpreted as having any dependency or requirement relating to any one or combination of components illustrated in the exemplary computing system environment 900.

With reference to FIG. 9, an exemplary computing device for implementing one or more embodiments in the form of a computer 910 is depicted. Components of computer 910 may include, but are not limited to, a processing unit 920, a system memory 930, and a system bus 922 that couples various system components including the system memory to the processing unit 920. Processing unit 920 may, for example, perform functions associated with a processor(s) that executes one-click motor identification and configuration system 202 (e.g., processor(s) of computer 100), while system memory 930 may perform functions associated with a memory on which components of one-click motor identification and configuration system 202 are stored (e.g., memory of computer 100).

Computer 910 typically includes a variety of computer readable media and can be any available media that can be accessed by computer 910. The system memory 930 may include computer storage media in the form of volatile and/or nonvolatile memory such as read only memory (ROM) and/or random access memory (RAM). By way of example, and not limitation, system memory 930 may also include an operating system, application programs, other program modules, and program data.

A user can enter commands and information into the computer 910 through input devices 940, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 910. A monitor or other type of display device is also connected to the system bus 922 via an interface, such as output interface 950. In addition to a monitor, computers can also include other peripheral output devices such as speakers and a printer, which may be connected through output interface 950. In one or more embodiments, input devices 940 can provide user input via GUI 220, while output interface 950 can receive information relating to operations of the one-click motor identification and configuration system 202 from GUI 220.

The computer 910 may operate in a networked or distributed environment using logical connections to one or more other remote computers, such as remote computer 970. The remote computer 970 may be a personal computer, a server, a router, a network PC, a peer device or other common network node, or any other remote media consumption or transmission device, and may include any or all of the elements described above relative to the computer 910. The logical connections depicted in FIG. 9 include a network 972, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in any inferences described herein, components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

In view of the exemplary systems described above, methodologies that may be implemented in accordance with the described subject matter will be better appreciated with reference to the flowcharts of the various figures (e.g., FIGS. 3A-3C). While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system for configuring a motor controller, comprising:
   a memory; and
   a processor configured to execute components stored on the memory, the components comprising:
      a specify component configured to specify a motor in communication with the motor controller;

a display component configured to display information relating to a status of the motor controller; and a single-action identification and configuration component configured to, in response to performance of a single input action, perform an identification and configuration sequence comprising at least three identification steps to establish a single parameter for driving the motor, the single parameter for driving the motor comprising bandwidth.

2. The system of claim 1, wherein the specify component is further configured to specify values of properties relating to the motor.

3. The system of claim 2, wherein the properties comprise at least one of a rated speed, a rated current, a rated voltage, pole pairs, or encoder lines.

4. The system of claim 3, wherein the specify component is configured to receive at least one of the values of the properties as user-defined input data.

5. The system of claim 3, wherein the specify component is configured to determine at least one of the values of the properties automatically based on data measured from the motor.

6. The system of claim 1, wherein the display component is further configured to update a rendering of the information relating to the status of the motor in real time as the single-action identification and configuration component performs the configuration sequence comprising the at least three steps.

7. The system of claim 6, wherein the rendering of the information comprises respective different graphics for the at least three identification steps comprising the identification and configuration sequence.

8. The system of claim 6, wherein rendering of the information comprises a progress indicator that is common among the at least three identification steps comprising the identification and configuration sequence.

9. The system of claim 1, wherein the single-action identification and configuration component is further configured to calculate a range of permissible bandwidths.

10. The system of claim 9, wherein the single-action identification and configuration component is further configured to calculate, as the bandwidth, a recommended bandwidth within the range of permissible bandwidths.

11. The system of claim 10, wherein the display component is further configured to render the permissible bandwidths and the recommended bandwidth upon a conclusion of the identification and configuration sequence.

12. The system of claim 1, further comprising a notch filter configuration component configured to attenuate a range of frequencies from a signal around a resonant peak.

13. A method, comprising:
specifying, by a system comprising a processor, a motor in communication with a motor controller;
displaying, by the system, information relating to a status of the motor controller; and
in response to performance of a single input action, performing, by the system, a sequence comprising at least three steps to establish a single parameter for driving the motor, the single parameter for driving the motor comprising bandwidth.

14. A non-transitory computer-readable medium having stored thereon executable components that, in response to execution by a system comprising a processor, cause the system to perform operations, the operations comprising:
specifying a motor of a motion system comprising the motor in communication with a motor controller;
displaying information relating to a status of the motor controller; and
in response to performance of a single input action, executing a sequence of operations comprising at least three steps that determine a single parameter for driving the motor, the single parameter for driving the motor comprising bandwidth.

15. A system for configuring a motor controller, comprising:
a memory; and
a processor configured to execute components stored on the memory, the components comprising:
a specify component configured to specify a motor in communication with the motor controller;
a display component configured to display information relating to a status of the motor controller; and
a single-action identification and configuration component configured to, in response to performance of a single input action, perform an identification and configuration sequence comprising at least three identification steps to establish a single parameter for driving the motor, wherein the at least three steps respectively comprise measurement of one or more system parameters, measurement of noise, and measurement of resonance.

16. The system of claim 15, wherein the measurement of the one or more system parameters comprises measurement of one or more electrical parameters and measurement of one or more mechanical parameters.

17. The system of claim 16, wherein the one or more electrical parameters comprise at least one of resistance, inductance, or flux, and the one or more mechanical parameters comprise at least one of inertia, viscous friction, and coulomb friction.

18. The system of claim 15, wherein measurement of resonance comprises calculation of more than one resonant frequency.

19. A system for configuring a motor controller, comprising:
a memory; and
a processor configured to execute components stored on the memory, the components comprising:
a specify component configured to specify a motor in communication with the motor controller;
a display component configured to display information relating to a status of the motor controller;
a single-action identification and configuration component configured to, in response to performance of a single input action, perform an identification and configuration sequence comprising at least three identification steps to establish a single parameter for driving the motor; and
a drive component configured to run the motor following determination of the bandwidth.

20. The system of claim 19, wherein the motor is run at a target frequency selected by the user.

21. The system of claim 20, wherein the display component is further configured to display feedback information corresponding to an actual frequency at which the motor is run relative to the target frequency.

* * * * *